(12) United States Patent
Fiderer et al.

(10) Patent No.: US 12,069,326 B2
(45) Date of Patent: Aug. 20, 2024

(54) MEDIAHUB FOR CONTROLLING AND MONITORING THE DISTRIBUTION OF TARGETED ASSETS

(71) Applicant: INVIDI Technologies Corporation, Princeton, NJ (US)

(72) Inventors: Howard Fiderer, Princeton Junction, NJ (US); Daniel C. Wilson, Edmonton (CA)

(73) Assignee: Invidi Technologies Corporation, Princeton, NJ (US)

( * ) Notice: Subject to any disclaimer, the term of this patent is extended or adjusted under 35 U.S.C. 154(b) by 0 days.

(21) Appl. No.: 17/659,420

(22) Filed: Apr. 15, 2022

(65) Prior Publication Data

US 2023/0007330 A1 Jan. 5, 2023

Related U.S. Application Data

(63) Continuation-in-part of application No. 16/592,405, filed on Oct. 3, 2019, now Pat. No. 11,451,848.

(Continued)

(51) Int. Cl.
*H04N 21/262* (2011.01)
*H04N 21/234* (2011.01)
*H04N 21/258* (2011.01)

(52) U.S. Cl.
CPC . *H04N 21/26241* (2013.01); *H04N 21/23424* (2013.01); *H04N 21/25833* (2013.01); *H04N 21/25883* (2013.01)

(58) Field of Classification Search
CPC ....... H04N 21/26241; H04N 21/23424; H04N 21/25833; H04N 21/25883; H04N 21/2547; H04N 21/44204; H04N 21/6582; H04N 21/812; H04N 21/2668; H04N 21/2407; H04N 21/252; H04N 21/4532; H04N 21/25891; H04N 21/4622; H04N 7/17318; H04N 21/47202; H04N 21/2665; H04N 21/6175; H04N 21/6125; H04N 21/64322; H04N 21/4755; H04N 21/41407; H04N 21/4524; H04N 21/25841; H04N 21/4516;

(Continued)

(56) References Cited

U.S. PATENT DOCUMENTS 7,730,509 B2 * 6/2010 Boulet ............. H04N 21/23424
725/9
9,026,668 B2 * 5/2015 Harrison ................. H04L 67/51
709/229

(Continued)

OTHER PUBLICATIONS

Office Action, dated Dec. 20, 2022, issued in related IN Patent Application No. 202117018257.

*Primary Examiner* — Cynthia M Fogg
(74) *Attorney, Agent, or Firm* — Davis Graham & Stubbs LLP

(57) ABSTRACT

The present invention relates generally to the provision of targeted advertisements in media. Systems and methods are described which facilitate addressable and non-addressable distribution of assets across a plurality of distribution networks and platforms. In this regard, an advertiser may be able to place a single order for advertising through a media distribution platform that allocates and distributes the asset via multiple channels such as internet streaming, websites (e.g., banners, pop-ups, overlays, etc.), cable, satellite, etc.

34 Claims, 27 Drawing Sheets

Related U.S. Application Data

(60) Provisional application No. 63/175,157, filed on Apr. 15, 2021, provisional application No. 62/742,107, filed on Oct. 5, 2018.

(58) Field of Classification Search
CPC ............... G06Q 30/02; G06Q 30/0269; G06Q 30/0251; G06Q 30/0242; G06Q 30/0241; G06Q 30/0255; G06Q 30/0271; G06Q 30/0224
USPC .......................................................... 725/34
See application file for complete search history.

(56) References Cited

U.S. PATENT DOCUMENTS

| | | | |
|---|---|---|---|
| 9,396,475 B2* | 7/2016 | Cristofalo | G06Q 30/02 |
| 2002/0123928 A1* | 9/2002 | Eldering | G06Q 30/0254 |
| | | | 348/E7.071 |
| 2007/0022032 A1* | 1/2007 | Anderson | G06Q 30/0269 |
| | | | 348/E7.071 |
| 2007/0130012 A1* | 6/2007 | Yruski | G06Q 30/0267 |
| | | | 705/14.68 |
| 2007/0220575 A1* | 9/2007 | Cooper | H04N 21/41415 |
| | | | 348/E7.071 |
| 2007/0288953 A1* | 12/2007 | Sheeman | G06Q 30/08 |
| | | | 725/34 |
| 2009/0055268 A1* | 2/2009 | Knoller | H04N 21/2665 |
| | | | 705/26.1 |
| 2010/0082422 A1* | 4/2010 | Heilig | G06Q 30/02 |
| | | | 705/14.41 |
| 2010/0223637 A1* | 9/2010 | Hubbard | G06Q 30/00 |
| | | | 725/115 |
| 2010/0324992 A1* | 12/2010 | Birch | H04N 21/4722 |
| | | | 725/32 |
| 2013/0111519 A1* | 5/2013 | Rice | G06Q 30/02 |
| | | | 725/34 |
| 2013/0198005 A1* | 8/2013 | Xiong | H04N 21/812 |
| | | | 709/219 |
| 2013/0326554 A1* | 12/2013 | Shkedi | H04N 21/812 |
| | | | 725/34 |
| 2015/0127451 A1* | 5/2015 | Yeager | G06Q 30/0248 |
| | | | 705/14.47 |
| 2015/0237386 A1* | 8/2015 | Sheehan | H04N 21/4756 |
| | | | 725/34 |
| 2017/0034591 A1* | 2/2017 | Ray | G06Q 30/0269 |
| 2017/0193547 A1* | 7/2017 | Berrett | G06Q 30/0244 |
| 2017/0236150 A1* | 8/2017 | Fiderer | G06Q 30/0251 |
| | | | 705/14.49 |
| 2018/0063596 A1 | 3/2018 | Joglekar et al. | |
| 2018/0091850 A1* | 3/2018 | Sandholm | H04N 21/252 |
| 2018/0336589 A1* | 11/2018 | Ye | G06Q 30/0204 |
| 2019/0080365 A1* | 3/2019 | Chaar | G06Q 30/0276 |
| 2019/0174156 A1* | 6/2019 | Crawford | H04N 21/812 |

* cited by examiner

All Proposals →

ID: 1101122 • Client Name • Advertiser Name • October 1, 2018   DRAFT

Get started by telling us some basic information.

Enter Campaign Name     Advertiser Name   ID: 1101122

TARGET

Budget        Desired Impressions   Number of Households   Segment Name
$750,000      4,000,000             800,000                Segment Name

FLIGHT

Start Date    Duration              Days of Week           Frequency Capping
Nov 1, 2018   10   Weeks            Every Day              3

Save Draft    Next

FIG.8B

Line Info

Campaigns → NMC-Q120 Promo →
Add a Line NMC-Q120-Promo

Updated Today 14:07:18 GMT

| Line Info | | |
|---|---|---|
| Target Audience | LINE DETAILS | Help |
| Flighting | NMC-21489315 | Define the line details (including the line type) as well as whether this line has a unique impression goal or if its impressions are part of the larger campaign goal. |
| Distribution | Aggregation | |
| Assets | IMPRESSIONS | |
| | 500,000 | |
| | 10 | |
| | $45.00 | |

⊙ COPY AN EXISTING LINE

SUPPORT ARTICLES

Known Advertiser Campaigns
Baseline Doc
September 30, 2019 by
Bob Sullivan

Execution Time Log Files
December 5, 2018 by
Anna Westerly

CANCEL  SAVE & EXIT        CONTINUE

FIG.9

Audience & Platforms

Campaigns → NMC-Q120 Promo →
Add a Line NMC-Q120-Promo

Updated Today 14:07:18 GMT  ②

Line Info
| Target Audience
Flighting
Distribution
Assets

TARGET AUDIENCE

Help

TARGET AUDIENCE SETTINGS

Segment  Advertiser Segment 1

Male  18-34 Years  $75,000+  Auto Intenders  20.5%

Define the target audience, including any device-specific requirements.

PLATFORMS

| LINEAR STB | LINEAR TVE | LINEAR QTT | VOD OTT | OAR |
|---|---|---|---|---|
| | | | | SMART TV |

SUPPORT ARTICLES

Considerations for specifying target devices
January 25, 2019 by Sofia Slavens

Troubleshooting narrow audience selection.
July 14, 2017 by Lee Raven

CANCEL   SAVE & EXIT   CONTINUE

FIG. 10

MediaHub:
Campaign Sales Front End

Campaigns → NMC-Q120 Promo →
Add a Line NMC-Q120-Promo

Updated Today 14:07:18 GMT

Line Info
Target Audience    Flighting
Flighting          TIMELINE
Distribution       06/01/2020-07/31/2020
Assets June    July

CANCEL  SAVE & EXIT        SAVE  CONTINUE

Start Date - End Date

Select the requested start and end dates Note that other lines may have overlapping flighting

FLIGHTING SCHEDULE

SUPPORT ARTICLES

Comprehensive Campaign Entry

- Supports multiple Sales models
- Impression Targets
- Frequency Caps
- CPM information
- Audience Targeting
- Flighting Rules

FIG.11

Flighting

Campaigns → NMC-Q120 Promo →
Add a Line NMC-Q120-Promo

Updated Today 14:07:18 GMT

Line Info
Target Audience
| Flighting
Distribution
Assets

Flighting

TIMELINE
02/03/20-02/17/20

January  February

③  ⑰

Start Date - End Date
Select the required start and end dates.
Note that other lines may have overlapping flighting.

FLIGHTING SCHEDULE

CANCEL  SAVE

SUPPORT ARTICLES

How to fix missing impressions
May 30, 2017 by Adam Sinclair

Best practices for configuring flighting
February 3, 2018 by Logan Fox

CANCEL  SAVE & EXIT  CONTINUE

FIG. 12

Partners

Campaigns → NMC-Q120 Promo →
Add a Line NMC-Q120-Promo

Updated Today 14:07:18 GMT

Line Info
Target Audience
Flighting
| Distribution
Assets

Distribution

DISTRIBUTORS

○ DIRECTV | dish | verizon COMCAST | Frontier | altice

PROPORTIONAL  CUSTOM

DirecTV  1,760,000  350,000
Dish     1,060,000  210,000
Verizon    590,000  120,000
Frontier   240,000   50,000
Altice     350,000   70,000
Total    4,000,000  800,000

Help

Lorem ipsum dolor sit
amet consectetur
adipiscing

SUPPORT ARTICLES

Lorem ipsum dolor sit
amet
May 10. 2017 by Adam
Sinclair

Lorem ipsum dolor sit
amet consectetur
adipiscing,
February 8, 2018

CANCEL | SAVE & EXIT                    CONTINUE

FIG.13

Assets

Campaigns → NMC-Q120 Promo →
Add a Line NMC-Q120-Promo

Updated Today 14:07:18 GMT

Line Info
Target Audience
Flighting
Distribution
| Assets

Assets

VIDEO DATA

Filename  Video Filename
Ad Length  00:30:00

Value
Value

⊕ ADD ANOTHER VIDEO

Help

Enter the exact URL for the
campaign line asset and select a
transcoding option from the list

SUPPORT ARTICLES

Supported asset the types
February 8, 2018 by Richard
Barth

Troubleshooting asset errors
April 20th by Nathan York

[CANCEL] [SAVE & EXIT]   [CONTINUE]

FIG.15

ID: 1101122 • Client Name • Advertiser Name • October 1, 2018  DRAFT

All Proposals → Campaign Name

TARGET

BUDGET
$750,000

Impressions
$4,000,000

60,000
Segment
Segment Name

FLIGHT TIME

Start Date
November 1, 2019
Duration
10 Weeks
Days of the Week
Every Day
Frequency Cap
3

ALLOCATIONS    Proportional  Custom

| | DirecTV | Dish | Verizon | Frontier | Altice |
|---|---|---|---|---|---|
| | 1,760,000 Impressions | 1,060,000 Impressions | 590,000 Impressions | 240,000 Impressions | 350,000 Impressions |
| | 350,000 Households | 210,000 Households | 120,000 Households | 50,000 Households | 70,000 Households |

REACH    Household  Device

ESTIMATED COST

CPM     $75
Total   $755,000

BY DISTRIBUTOR
DirecTV   $150,000
Dish      $150,000
Verizon   $150,000
Frontier  $150,000
Altice    $150,000

Save Draft | Submit For Approval

FORECASTED IMPRESSIONS 1,200,000
1,000,000
800,000
600,000
400,000
200,000

NOV 2018    DEC 2018    JAN 2019

FIG. 16

| CAMPAIGN | READINESS | LINES & ASSETS | TIMELINE | TARGET STATUS | CREATIVE STATUS |
|---|---|---|---|---|---|
| NYC Transit Campaign<br>Client Name • Advertiser Name<br>Creator Name<br>Created on 10/02/19 | 100% | [1/3] | Starts on 11/20/19<br>Ends on 12/20/19<br>Flight time is 30 Days<br>15 days from launch | Distributed<br>ID1234567 | Distributed<br>ID1234567 |
| ○ Adobe Manifesto<br>Client Name • Advertiser Name<br>Creator Name<br>Created on 10/02/19 | 90% | [1/3] | Starts on 11/02/19<br>Ends on 11/17/19<br>Flight time is 15 Days<br>5 days from launch | Approved Oct 26, 2019 12:00PM by Jane Doe<br>Distributed | Approved Oct 26, 2019 12:00PM by Jane Doe<br>Received |
| Ford Product Release<br>Client Name • Advertiser Name<br>Creator Name<br>Created on 10/02/19 | 40% | [1/3] | Starts on 11/30/19<br>Ends on 12/30/19<br>Flight time is 30 Days<br>15 days from launch | Approved Oct 26, 2019 12:00PM by Jane Doe<br>Received | Review<br>ID1234567 |
| KP Thrive Spot | 10% | 1/2 PENDING | Starts on 11/30/19<br>Ends on 12/30/19<br>Flight time is 30 Days | Not Received<br>Request | Approved Oct 26, 2019 12:00PM by Jane Doe<br>Not Received<br>Request |

FIG. 17

MediaHub:
Distributor Approval Process

Distribution Acceptance

- Line information & Asset details
- Simple Approval/Rejection Process

Review NMC-20166525

Review Checklist
- Line Info  ○
- Asset  (REJECT) (APPROVE)
- Reason for rejection
  Inappropriate/Offensive Content
- ☑ Quality Issue
- Asset Length
- Optional Comments

[Next]

Submit

Line info

Line Details
Provider          Warner Media
Managed By        Tess Walters

Type              Aggregation
Impression        16,000,000
Frequency Cap     0
Priority          2
Separation        5

Flighting
Start Date        June 1, 2020
End Date          July 31, 2020

Day Part          AM              PM
Sunday            Lorem           Lorem
Monday            ipsum           ipsum
Tuesday           dolor sit       dolor sit
Wednesday         amet,           amet,
Thursday          consecte        consect
Friday            tuer            etuer
Saturday          adipiscin       adipisci Stop Weeks        None Asset ID          NMCWIN1234567890
Length            00:32.00

Asset

| CAMPAIGN | READINESS⌄ | LINES & ASSETS | TIMELINE | DISTRIBUTOR | TARGET | CREATIVE | ATTRIBUTION |
|---|---|---|---|---|---|---|---|
| NYC Transit Campaign<br>Client Name • Advertiser Name<br>Creator Name<br>Created on 10/02/19 | 100% | 1/3 | Starts on 11/20/19<br>Ends on 12/20/19<br>Flight time is 30 Days<br>15 days from launch | DIRECTV<br>DISH<br>VERIZON<br>FRONTIER<br>ALTICE | ◉◉<br>◉◉<br>◉◉<br>◉◉<br>◉ | ▬▬<br>▬▬<br>▬▬<br>▬▬<br>▬ | ♩ ○ ♩ ♩ ♩<br>♩ ○ ○ ○ ○<br>♩<br>♩<br>♩ |
| ○ Adobe Manifesto<br>Client Name • Advertiser Name<br>Creator Name<br>Created on 10/02/19 | 90% | 1/3 | Starts on 11/02/19<br>Ends on 11/17/19<br>Flight time is 15 Days<br>5 days from launch | DIRECTV<br>DISH<br>VERIZON<br>FRONTIER<br>ALTICE | ◉<br>◉<br>◉<br>◉ | ● :<br>● :<br>● ●<br>● ● | ♩ ○ ♩ ♩ ♩<br>♩ ♩ ♩ ♩ ♩ |
| Ford Product Release<br>Client Name • Advertiser Name<br>Creator Name<br>Created on 10/02/19 | 40% | 1/2 | Starts on 11/30/19<br>Ends on 12/30/19<br>Flight time is 30 Days<br>15 days from launch | DIRECTV<br>DISH<br>VERIZON<br>FRONTIER<br>ALTICE | ●<br>●<br>●<br>● | ▬● :<br>▬<br>● :<br>● | ♩ ♩ ♩ ♩ ♩<br>○ ○ ○ ○ ○ |
| KP Thrive Spot | 10% | PENDING | Starts on 11/30/19<br>Ends on 12/30/19<br>Flight time is 30 Days | DIRECTV<br>DISH<br>VERIZON<br>FRONTIER<br>ALTICE | | | |

FIG.21

PRE-LAUNCH ACTIVITY
Ford Product Release

Created on Oct 11, 2019, 12:00PM

○ 5 days past launch date

Starts on Nov 2, 2019, 12:00PM
Ends on Nov 17, 2019, 12:00PM
Flight Time is 15 Days Asset Name is adobe_manifest_30sec-v45

| DISTRIBUTOR | TARGET | CREATIVE | | | | ATTRIBUTION |
|---|---|---|---|---|---|---|
| DIRECTV | ● Received | ID1234567 ⊂⊃ Distributed | ID1234567 | 10/30/2019 12:00PM by Jane D | | |
| DISH | ● Received | ID1234567 ⊂● Approved | ID1234567 | 10/30/2019 12:00PM by Jane D | | |
| VERIZON | ● Received | ID1234567 ⊂● Approved | ID1234567 | 10/30/2019 12:00PM by Jane D | | |
| FRONTIER | ● Received- | ID1234567 ● Received | ID1234567 | 10/30/2019 12:00PM by Jane D | | |
| ALTICE | | ⊂⊃ Distributed ID1234567 ● Rejected | ID1234567 | 10/30/2019 12:00PM by Jane D | | |

[Follow Up]

Campaigns →
PRE-FLIGHT

CAMPAIGN    READINESS ∨

NYC Transit    100%
Campaign
Client Name • Advertiser Name
Creator Name
Created on 10/02/19

○ Adobe Manifesto 90%
Client Name • Advertiser Name
Creator Name
Created on 10/02/19

Ford Product    40%
Release
Client Name • Advertiser Name
Creator Name
Created on 10/02/19

KP Thrive Spot    10%

FIG.22

Campaigns Summary

| Campaigns | | | | | | Updated Today 14.07.18 GMT |
|---|---|---|---|---|---|---|
| ALL IN-FLIGHT PRE-FLIGHT POST-FLIGHT CANCELED | | | | | | NEW EXPORT |

🔍 SEARCH  FILTER ˅

| CAMPAIGN ID ˅ | STATUS | IMPRESSIONS | TYPE | START DATE | END DATE | CREATIVE |
|---|---|---|---|---|---|---|
| NMC-Q120-Promo | SCHEDULED | 3,000,000 | Aggregation | January 20, 2020 | February 17, 2020 | |
| SIC-NewCost-2020 | ●AT RISK | 368,772/1,000,000 | Aggregation | December 26, 2019 | January 23, 2020 | |
| Campaign ID 12345 | ●ON TRACK | 121,931/500000 | Zone Targeted Advertising (ZTA) | January 01, 2020 | February 01, 2020 | |
| Campaign ID 12345 | ●ON TRACK | 238,851/250,000 | Linear Non-Addressable | December 13, 2019 | January 10, 2020 | |
| Campaign ID 12345 | ●ON TRACK | 290,178/500,000 | Aggregation | December 16, 2019 | January 23, 2020 | |
| Campaign ID 12345 | ●ON TRACK | 121,931/500,000 | Zone Targeted Advertising (ZTA) | January 01, 2020 | February 01, 2020 | |
| Campaign ID 12345 | ●ON TRACK | 238,851/250,000 | Aggregation | December 13, 2019 | January 10, 2020 | |

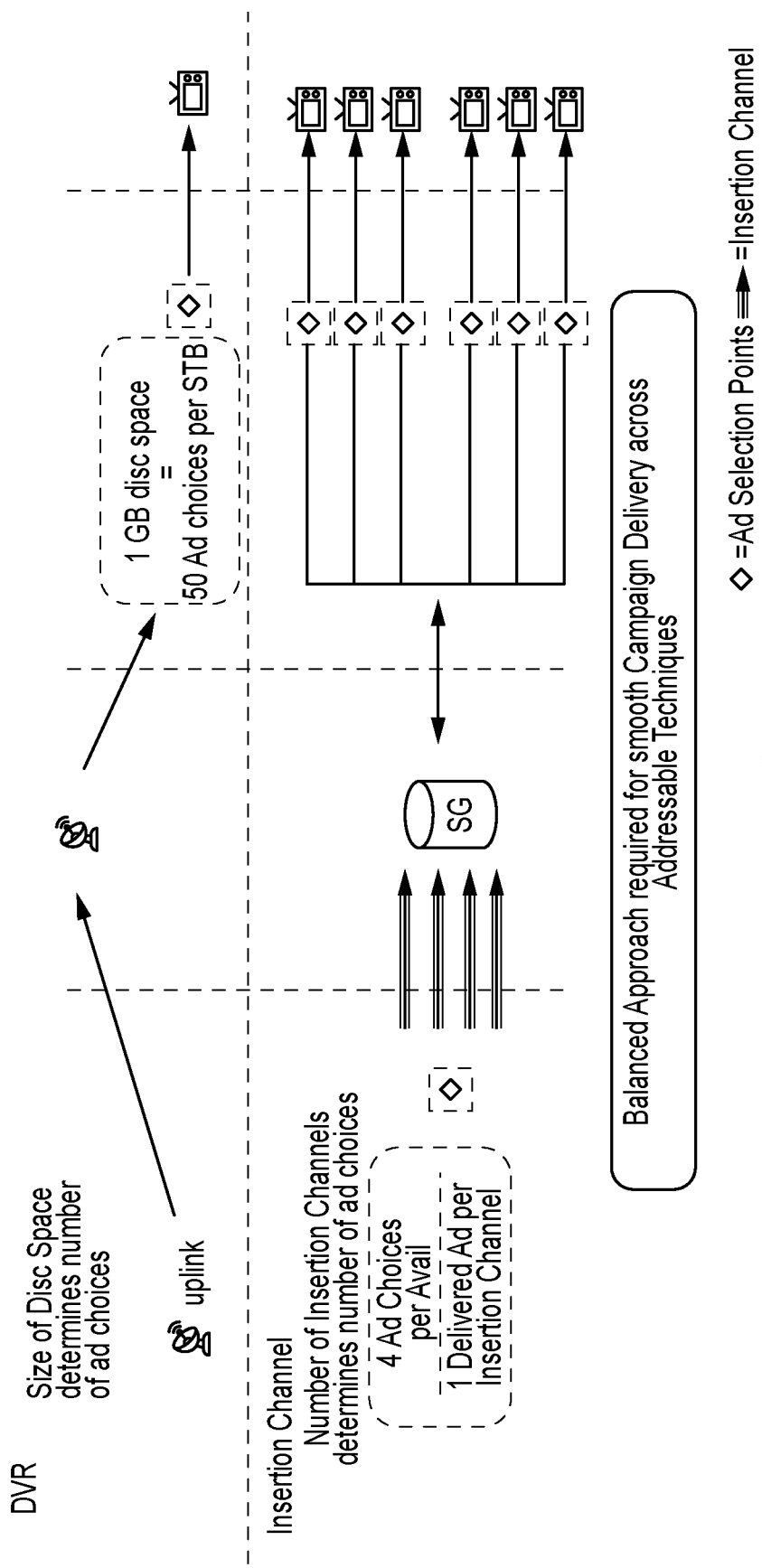

MEDIAHUB FOR CONTROLLING AND MONITORING THE DISTRIBUTION OF TARGETED ASSETS

CROSS-REFERENCE TO RELATED APPLICATION

This application is a continuation-in-part of U.S. patent application Ser. No. 16/592,405, entitled "MEDIAHUB FOR CONTROLLING AND MONITORING THE DISTRIBUTION OF TARGETED ASSETS, filed Oct. 3, 2019, which claims benefit of U.S. Provisional Patent Application No. 62/742,107, entitled "MEDIAHUB FOR CONTROLLING AND MONITORING THE DISTRIBUTION OF TARGETED ASSETS, filed Oct. 5, 2018. And this application also claims benefit of U.S. Provisional Patent Application No. 63/175,157, entitled" MEDIAHUB FOR CONTROLLING AND MONITORING THE DISTRIBUTION OF TARGETED ASSETS", filed Apr. 15, 2021, the disclosures of which are hereby incorporated by reference in their entirety.

FIELD OF THE INVENTION

The present invention relates generally to the distribution of targeted assets such as advertisements in media. Systems and methods are described which provide a media distribution platform for streamlined interaction of content providers, content distributors and related service providers in relation to the distribution of targeted assets, including addressable and non-addressable assets.

BACKGROUND OF THE INVENTION

Network content or programming, including television shows, movies, news programs, and other content broadcast over the air, through a cable network or satellite, or online, is commonly provided in conjunction with associated informational content (or "assets"). These assets include advertisements delivered during program breaks, advertisements overlaid on or digitally inserted into programming, associated programming, public-service announcements, ad tags, other on-screen graphics or audio messages, weather or emergency notifications and a variety of other content, including paid and unpaid content. In this regard, advertisers wishing to convey information regarding services and/or products to subscribers of the broadcast network often pay for the right to insert their information into programming of the broadcast network, either directly or through a sales channel. For instance, an advertiser may provide an asset to a network operator such that the asset may be interleaved with broadcast network programming during one or more advertising breaks in the programming. The delivery of such paid assets often subsidizes or covers the costs of the programming provided by the broadcast network. This may reduce or eliminate costs borne by the users of the broadcast network programming.

In order to achieve a better return on their investment, advertisers often try to target their assets to a selected audience that is believed to be interested in the goods or services of the advertiser. The case of advertisers on a cable or satellite television network is illustrative. For instance, an advertiser on such a television network may wish to target its assets to certain individuals having attributes based on, for example, geographic location, gender, age, income etc. Accordingly, once an advertiser has created an asset that is geared toward a desired group of viewers, the advertiser may attempt to procure insertion times ("spots") in the network programming when the targeted group of individuals is expected to be among the audience of the network programming.

Historically, network content is provided from a programmer (e.g., content provider such as a broadcaster or national cable network such as ABC, PBS, BBC, etc.) to one or more distribution network platforms (e.g., regional headend and/or local headends and/or repeater stations). These distribution network platforms receive the content and disseminate that content to network users ("subscribers"). In this regard, the network content is sometimes termed a "national feed." Typically, this national feed includes programming and interleaved assets. In this regard, national level advertisers who wish to disseminate their assets network-wide may pay to have their assets interleaved with the programming of the national feed. Accordingly, when the distribution network platforms disseminate the network content received via the national feed, the interleaved assets are disseminated therewith. That is, interleaving of assets with the national feed typically results in a single asset being disseminated over the entire broadcast network.

In some broadcast networks (e.g., such as those in the United States), one or more cues may also be incorporated into the national feed. Such cues have allowed distribution network platforms (e.g., local headends) to identify upcoming breaks in the programming contained in the national feed. Accordingly, such local headends may replace an asset within the national feed with an asset that is better suited for a local audience. Typically, in the United States, two to three minutes of every hour are set aside for local advertisements.

Advertising spots may be filled with conventional, non-addressable assets or, in some cases, with addressable assets. In non-addressable environments, an asset is inserted into the programming stream on a network-wide basis or on a local basis. In either case (local or network-wide), the same asset is delivered to all viewers of the program, at least within the respective network subdivision. In addressable environments, specific assets may be targeted to specific subscribers based on known consumer information such as demographics, credit, past purchases, etc., even in situations in which subscribers reside in the same network subdivision. For example, multiple potential assets may be delivered to two network subscribers who are both viewing the same television channel and both receive potential assets. The first device may deliver a first asset while the second device may deliver a second asset based on matching the targeting parameters of the assets to the classification parameters of the audience at those devices. Alternatively, the assets may not all be delivered to and stored at each device but, rather, only assets selected for insertion may be sent to a user's device as is the case where the first subscriber's device may only receive the first asset based upon delivery instructions from a distribution network platform while the second subscriber's device may only receive the second asset. As a further alternative, the potential assets may be sent in real-time, in synchronization with an ad break, or other asset delivery opportunity. The device may then select the appropriate asset for delivery (e.g., by tuning or hopping to a dedicated asset channel) based on instructions sent with the assets or otherwise.

Whether in addressable or non-addressable environments, advertisers generally desire to target assets to defined audiences within the limitations of the advertising environment. In conventional, non-addressable environments, this can be accomplished by using ratings information. Such ratings are generally obtained by monitoring the viewing behavior of viewers who have agreed to participate, generally with specialized equipment. By monitoring the programs watched by those viewers, and correlating those programs to known demographic information for those viewers, ratings can be developed that characterize the audience composition for certain programs in terms of various demographics, e.g., age, gender, income, etc. Because the monitored viewers comprise a relatively small portion of all viewing households, reliable and complete ratings information may be limited to programs having large viewing audiences that yield a statistically significant sampling for at least some demographics.

Armed with ratings information, advertisers can bid on spots in programs with an audience that is attractive to the advertiser. In many cases, the winning bidder for a spot may have a targeted audience that makes up only a small minority of the overall audience for that program and, in fact, may have a targeted audience smaller than that of other bidders. This frequently leads to inefficient use of advertising availability. Moreover, advertisers with a target audience that does not match any set of attributes for which ratings are available (e.g., current truck owners or undecided voters in a given Congressional District) are forced to identify sets of rated attributes that can serve as proxies for the attributes of the targeted audience or otherwise identify targeted spots (e.g., via independent research).

Additionally, in recent years, video-on-demand ("VOD"), Over-the-top ("OTT"), and other alternative means of streaming content have gained popularity. Along with the advent of these systems, additional advertising models have been developed. To date, these alternative advertising channels have been implemented in a disparate manner with respect to broadcast systems. In other words, the two mechanisms operate independently without integrated systems. The process of identifying, bidding on, and/or negotiating for available inventory in both broadcast and online streaming environments is a significant hurdle to efficient advertising campaigns. Currently each distribution network operates a separate advertising system. Each of these system employs disparate sales processes, pricing models, targeting data, and reporting capabilities. For example, each distribution network may enter into separate contract agreements with each advertiser, often requiring new negotiations for each advertising campaign. Along with the various contractual arrangements, there is a substantial degree of coordination involved with communicating campaign parameters and targeting data, transferring a copy of the asset, reporting information, etc. Not only does the immense amount of coordination (considering the substantial number of contractual arrangements) require a great deal of resources from a time and cost perspective, but it also can lead to delays in getting an asset inserted into programming. This may be problematic in situations in which time is of the essence.

Thus, there remains a need for a media distribution platform that improves the processes associated with purchasing advertising inventory, aggregates disparate targeting and reporting data, and improves the workflow of addressable and programmatic advertising.

SUMMARY OF THE INVENTION

The present invention is directed to utilities (e.g., methods, apparatuses, and systems) for facilitating the interaction of content providers, content distributors, and related service providers in relation to managing the distribution of assets through a central service. The utilities provide a centralized media distribution platform capable of performing a multitude of operations traditionally requiring an array of platforms and systems, these operations including, inter alia, inventory management, inventory yield optimization, cross-platform attribution, experience management, contracting, content distribution, target identification, campaign optimization, settlements, auditing, and reporting.

Distribution of assets may follow traditional programmatic or modern addressable models in broadcast networks. Traditional programmatic approaches rely upon broadcasting a particular asset to all subscribers in a network subdivision downstream of a particular network insertion point. In this regard, the term network subdivision may refer to any geographical region characterized as being downstream of a particular splice point in a distribution network. In the case of more modern, addressable environments, different viewers of a given program, even within a particular network subdivision, may receive different assets even while watching the same channel at the same time. This allows assets to be targeted based on location parameters independent of network topology, demographics, psychographics, or other targeting parameters or attributes of interest to an advertiser. Households or an individual user or users may be targeted based on attributes inferred from interaction with a set-top-box/user device or network, an identity or characteristics determined by sensors, information from network or third-party databases and/or other information sources. In this regard, "addressable" does not necessarily connote addressing of assets to terminals in a point-to-point (unicast) transmission, but also encompasses techniques by which specific assets can be delivered via specific terminals using broadcast or multi-cast protocols.

It should be noted that even in networks that support addressable asset delivery, many assets are still delivered in a non-addressable mode. This is due to a variety of limitations. First, some devices may not support addressable functionality. For example, in the case of satellite networks, a storage device such as a digital video recorder (that not all network users have) may be necessary to store targeted assets for subsequent insertion at the device. Similarly, in cable networks, some devices may not have the resources and logic required for executing addressable asset delivery. Over-the-air television generally does not support addressable asset delivery today and addressable asset delivery has not reached all areas. Moreover, some users may opt not to receive addressable assets where that option is provided by the network for privacy or other reasons.

Even where the equipment and network allow for addressable asset delivery, much inventory may be delivered in a non-addressable mode. For example, bandwidth or storage limitations may impose a practical limit on the number of spots that can be populated with addressable asset options. In addition, an addressable asset delivery system may only be implemented for either network-wide (e.g., national) or local asset delivery opportunities such as advertising avails or spots. Typically, today, in the United States, perhaps about 16 minutes per hour is composed of advertising, of which about 14 minutes may be national or network-wide spots while two minutes may be available for local assets. Also, network operators may choose to sell full spots rather than audience segments or individual impressions for business or other reasons.

Reporting may be utilized in addressable asset delivery systems to enable accurate billing and refine ratings information. Reporting is the process by which at least some individual set-top devices and/or other client devices report to the distribution network after an addressable asset has been delivered. For example, the report may indicate what asset was delivered, in connection with which spot or programming network/program, and various other information as will be described in more detail below. It will be appreciated that, where asset delivery decisions are made at the device, reporting is useful to allow for determination of delivery data for billing and provide for guaranteed delivery of targeted assets. Even where decisions are centrally directed, e.g., based on instructions from the headend or another distribution network platform, a broadcast network typically does not know which devices (e.g., set top boxes, televisions) are on, what channel the devices are tuned to and cannot provide accurate delivery data in the addressable asset delivery context absent reporting.

In accordance with the present invention, a media distribution platform may be configured for coordination with external clients including content providers, distributors/distribution services, advertising buyers, and sales channels. Content providers provide the program material and include cable networks, broadcasters and online content providers among others. Distributors are involved in distributing content and include MVPDs and aggregators like Netflix and Amazon among others. Advertising buyers buy advertising inventory such as ad breaks and product placement opportunities and include advertisers and agencies. Sales channels are the channels used to buy and sell advertising opportunities. The media distribution platform may also be used by content providers who access addressable advertising opportunities directly as in OTT contexts. Notably, both non-addressable and addressable advertising may be facilitated by the disclosed media distribution platform.

Inventory allocation information including available spots (e.g., local spots, national spots, online streaming spots, etc.) for programmatic insertion and/or predicted available impressions for addressable insertion may be communicated from inventory controllers, e.g., programmers and distribution networks, as well as independent ratings firms (reporting information from user devices as well as ratings information may be important), to the media distribution platform. With regard to available spots that are broadcast to a wide audience, distribution networks generally know with a high degree of certainty what spots they will have available and when and can therefore provide relatively accurate data. In contrast, impressions (meaning a single instance of an asset being delivered to a single user) may need to be predicted. This is, in part, due to the nature of addressable advertising in which it is unknown when each particular subscriber will be engaged with their devices or otherwise streaming programming. In this regard, reporting may be particularly important to determine the size of the audience that has received the asset. It will be appreciated that considerable care is required in representing overall inventory that encompasses both spots and impressions as, for example, impressions available for targeting in an addressable system may include audience members from separately counted spots. Moreover, impressions may be separated into different audience segments, e.g., based on gender, age, income, pet ownership, auto intender, lot size, etc. Accordingly, it may be useful to characterize available inventory for impressions in relation to predefined and standardized audience segments.

From the perspective of content providers, the inventory allocation process enables content providers to efficiently place asset distribution orders for various types of asset delivery opportunities across multiple content distributors as well as to directly access distribution services for their own OTT advertising opportunities. Inventory allocation information may be aggregated and stored for presentation to content providers and for assigning assets associated with later received campaign instructions. Content providers and/or advertising buyers may access the media distribution platform through the front-end module to submit assets (e.g., audio/video files) and to generate campaign instructions. Campaign instructions may include requirements such as target audience attributes, total number of impressions, minimum/maximum number of impressions per subscriber, frequency at which assets are to be presented to a single subscriber, campaign dates, etc. Additionally or alternatively, target audience attribute information may be automatically determined by the media distribution platform in response to receipt of campaign instructions containing alternative information such as the product to be sold, competitor products, other products associated with the product to be sold, etc. For example, a shoelace manufacturer may rely upon the media distribution platform to determine which subscribers to target by identifying those who recently made shoe purchases.

From the perspective of the content provider and distributor, the inventory allocation process enables efficient use of inventory of asset delivery opportunities, including spots, segments of spots, and targeted impressions. During the inventory allocation process, all such inventory or designated portions thereof can be made available to advertising buyers. Potential insertion orders from advertising buyers can be managed by the distribution platform, including orders of different distribution types. When a potential delivery request is identified, the distributor has an opportunity to accept, reject, or (optionally) request modification of a potential distribution order. In this manner, content distributors can efficiently fill inventory with appropriate content from multiple content providers for optimized inventory allocation.

The media distribution platform may receive a list of current subscribers from each distribution network for use in targeting subscribers. The list of subscribers may comprise anonymous subscriber keys to prevent access to personally identifiable information. The list of subscriber keys, in conjunction with campaign instructions, may be analyzed by one or more data management platforms ("DMPs") which contain or have access to consumer information. The media distribution platform, using the DMPs, may identify specific subscribers matching campaign instructions provided by an advertiser and send insertion orders (including, e.g., subscriber keys) to distribution networks for addressing the targeted assets to the respective subscribers. One or more device IDs, associated with media devices such as mobile phones, televisions, set-top boxes, PCs, etc., may be associated with each subscriber key.

Either the media distribution platform or a distribution network may select specific devices of each subscriber to target with an asset. In this regard, the media distribution platform may instruct a specific distribution network to send a specific asset to a specific device associated with a subscriber who has been selected to receive an advertisement based upon consumer information available to the DMPs. It should be appreciated that a DMP may identify a specific subscriber having one device associated with one distribution network and another device associated with another distribution network and, in response, may select one or both devices for receipt of the asset(s). For example, a media distribution platform may instruct a mobile data distribution network to send an asset to a subscriber's mobile phone and may also instruct a satellite television distribution network to send the asset to the same subscriber's device. Alternatively, in a coordinated advertising campaign, a first asset from an advertiser may be sent to a first device associated with a subscriber and a second, but related, asset from the same advertiser may be sent to a second device associated with the subscriber.

Importantly, a media distribution platform may be operable to target assets to users of various network and streaming systems (e.g., cable television, satellite television, OTT, VOD, etc.) in manner that presents a unified sales channel to advertising buyers. For example, an asset provider may purchase a specified quantity of impressions to a given attribute group corresponding to the provider's campaign instructions. The advertising buyer optionally, may not even care to select specific network or streaming systems but rather may rely only upon their campaign instructions specifying a desired number of impressions and attributes associated with target subscribers while allowing the media distribution platform to select appropriate distribution networks. In response, the media distribution platform may identify users of various networks (e.g., mobile data network subscribers and cable network subscribers) matching the attribute requirements and transmit the asset to those subscribers in accordance with the campaign instructions. The allocation of asset deliveries as between delivery networks may be implemented to optimize the budget or return on investment of the advertising buyer and/or revenues of the distribution networks. Moreover, the allocation between different distribution networks may be proportional or otherwise differentiated. For example, an advertising buyer may specify that the total number of impressions should be capped and distribution should be proportional with respect to broadcast distribution networks/modes that have accepted the campaign order, but that the number of impressions should be maximized with respect to OTT distribution networks/modes, e.g., due to associated costs.

Moreover, optimization may be implemented in relation to other factors such as conversions (web site visits, purchases or other actions correlated to asset delivery). For example, the media distribution platform may attempt to optimize conversions across all campaigns. Such conversion information may be obtained from a DMP or other service provider based on correlating web traffic information, purchase information (e.g., from credit card or loyalty program records) or other conversion information to reporting information. Reporting information from the various networks may also be aggregated and returned to the advertiser to confirm the purchased impressions were delivered.

The reports can also be used to generate further analytics of interest to advertisers, network administrators, and others. Such analysis can involve developing information concerning levels of interest ("LOI") and conversions by audience members. Conversions refer to events where a viewer takes some action desired by the advertiser after viewing the asset. Examples include visiting a website of the advertiser or otherwise requesting additional information, taking some specific action such as a test drive or ordering a free sample, and, of course, purchasing the product or service advertised. The last of these is perhaps the ultimate measure of ad effectiveness. Information concerning conversions may be obtained from internal or external sources. With regard to internal sources, an example is inputs to a Request for Information ("RFI") program. In some cases, in connection with addressable advertising systems, it is possible for a viewer to request more information in relation to an asset or other content. For example, the user may provide a designated remote-control input during an asset or submit an alphanumeric code or other identifying information to a website or RFI platform. In response, the user can obtain further product information, promotional information, offers or the like. Reports may provide information regarding a level of interest or lack thereof by the audience receiving the asset. For example, the report may indicate that some viewers tuned-away during the asset or muted the asset. In addition, the report may indicate a confidence level that the viewer was present and engaged (e.g., based on how long it has been since the viewer last interacted with the device) and may provide information regarding attributes of the current audience (e.g., how many viewers, how well they match the targeting parameters for the ad, current estimates of classification parameters, or a putative identification of a current viewer). Such interest information may be analyzed, for example, to gather information concerning asset effectiveness.

External sources of information associated with DMPs can also be used, for example, to monitor subsequent purchasing decisions of an audience member. Potential sources of such information include credit card records, store loyalty program records, embedded pixels on web sites, new vehicle registrations, and surveys, among others. Still further potential sources of direct response purchases may include a 1-800 number, online ordering or help desk, or the like. Report information can be correlated to such purchasing decision information to determine whether audience members have purchased a product (or a competitive product or a related product) after viewing an asset or set of assets. Considered collectively, attribute information, voting, reports, and information concerning interest and concerning conversions provide a tremendous amount of audience information related to addressable advertising systems.

A media distribution platform may be communicatively coupled to a plurality of ancillary platforms. These ancillary platforms may perform supplemental functions (i.e., functions that are not core to the media distribution platform or that support functions performed by the media distribution platform). Ancillary platforms may be operated by third-party providers ("partner organizations") and incorporated into the media distribution platform network. For example, a cloud-based API may be configured to allow remote access by and communication with partner organizations. Alternatively, some ancillary platforms may be locally disposed within or integrated into a media distribution platform. Ancillary platforms include, inter alia, DMPs, auditing, creative distribution, yield management platforms, device graphs, settlement services, programmatic buying extension, and campaign optimization tools.

In an embodiment, a media distribution platform for assets may include a distribution network module, a data management platform, and a front-end module. A distribution network module may be configured to receive a plurality of subscriber keys from one or more distribution networks. The subscriber keys may correspond to subscribers of the distribution networks. A data management platform may be configured to receive the subscriber keys and identify which of the subscribers are associated with various target attributes based upon consumer information available to or stored at the data management platform. In this regard, the subscribers may be evaluated using a predetermined set of attributes. For example, the data management platform may evaluate each subscriber based on age bands (e.g., does subscriber A fall into the 20-29 age bracket). Alternatively, the data management platform may retrieve specific attributes that are not associated with any predetermined characteristic groups or bands. For example, subscriber A is 37 years old. In the latter instance, the sales front end of a media distribution platform may assign, group, classify, or otherwise organize attributes for presentation to advertisers. The DMP may also be used to obtain customer or target lists from a content provider and match those to the subscriber keys. In this manner, content providers can use their own internal data, customer lists, and proprietary segmentations without having to divulge this data to the content distributors.

The front-end module of a media distribution platform may be configured to receive inventory allocation information from inventory owners indicative of available advertising opportunities in programming content. In this regard, an inventory owner may be any party having an advertising opportunity for sale, for example, a broadcaster, a cable network, a distribution network, an internet service provider, etc. The front-end module may further be configured to provide selectable targeting attributes to an advertiser via an advertiser interface. Selectable targeting attributes may be any potential audience attributes that an advertiser may wish to target. These selectable targeting attributes may be automatically populated based on consumer information retrieved by a data management platform, may be predetermined based upon standard industry options, may be manually entered by an administrator of the media distribution platform, or may be otherwise defined in any appropriate manner.

A front-end module, a data management platform, or another component of a media distribution platform in accordance with the present invention may be operable to harmonize disparate targeting attributes and/or inventory allocation information. In this regard, targeting attribute categories or characteristics received from two or more different sources may not be identical. For example, a first source may use ten-year age bands (e.g., 20-29, 30-39, etc.) while a second source may use five-year age bands (e.g., 21-25, 26-30, etc.). In a similar regard, inventory owners may utilize different inventory allocation information schemes. For example, a first inventory owner may indicate availability of impressions to users residing in Pittsburgh while a second inventory owner may indicate availability of impressions to users in Pennsylvania. In any of the above-mentioned scenarios, a media distribution platform may be operable to harmonize the disparate characteristics by assimilating characteristics from disparate sources into standardized classifications. In this regard, a media distribution platform may implement a targeting attribute and/or inventory allocation information scheme that comprises predetermined or dynamic characteristic groupings. As targeting attributes are received from a data management platform or as inventory allocation information is received from inventory owners, the characteristics associated with such information (e.g., tags) may be analyzed and optionally modified for conformance with the implemented scheme. In turn, information presented to potential advertisers via the advertiser interface may be homogeneously classified for ease of use and equitable distribution of available inventory (e.g., if only one distribution network utilized inventory allocation information that indicated the age band of 22-23 years old, then 100% of the impressions purchased by an advertiser selecting 22-23 years old would be allocated to that distribution network at the exclusion of all other distribution networks).

Furthermore, a front-end module may receive campaign instructions and an asset (intended for distribution) from an advertiser. Campaign instructions may include one or more selected targeting attributes selected from the plurality of selectable targeting attributes discussed above. The instructions may also include various placement rules/constraints relating to content distributors, platforms, networks, genres, program ratings, etc. Additionally, a quantity of subscribers associated with the at least one selected targeting attribute may be included in the campaign instructions. This quantity may be used to calculate insertion orders for various distribution networks. The distribution network module may be further configured to transmit insertion orders to one or more distribution networks. The insertion orders may include the asset to be distributed or the asset may be transferred to the distribution networks independently. Insertion orders may also include a campaign target list corresponding to selected subscribers associated with at least one target attribute which corresponds to at least one selected targeting attribute. In this regard, a selected targeting attribute may envelope a range of values or qualities defined by target attributes determined by the data management platform(s). For example, a target attribute may be defined as "age 21" whereas a selected targeting attribute selected by the respective advertiser may be "age 20-29." Similarly, a target attribute may be defined as "purchased a 2016 Ford Explorer on Nov. 1, 2016" whereas a selected targeting attribute may be defined as "purchased a vehicle between 2010 and 2018." Further in this regard, the term selected subscribers may be defined as those subscribers who have a target attribute that satisfies a selected targeting attribute selected by an advertiser.

A media distribution platform may be operable to combine inventory allocation information from a variety of sources. For example, inventory owned by a cable network may be presented to an advertiser in conjunction with inventory owned by a satellite provider. In some instances, the information presented to the advertiser may prevent the advertiser from discerning which inventory is owned by which party. Rather, the advertiser may simply be presented with available attribute options (e.g., age, income, recently purchased a given product, etc.) and a range of impressions that may be purchased (e.g., 0 to 100 M). In contrast, an advertiser may be presented with the option of selecting various types of inventory owners with which to transact (e.g., over-the-air broadcasters only).

Inventory allocation information may be associated with an inventory owner key unique to or otherwise associated with an inventory owner. It will be appreciated that a content provider may sub-allocate its inventory to different owners such as agencies who buy the inventory in an upfront sales process. Thus, a key may identify an agency, a content provider, and/or other party. In this regard, rather than storing (or presenting to users) identification information associated with an inventory owner (e.g., name of the company), such information may be anonymized. In turn, proprietary information such as available inventory, pricing, etc. may be kept confidential from competitors or other parties. When inventory allocation information is received at the media distribution platform, the media distribution platform may replace identification information with the respective inventory owner key. Data fields used by the data management platform that are related to the inventory owner may be populated with the inventory owner key. In this regard, the key, rather than the identification information, may be utilized by the media distribution platform and related third-party vendors in processing of inventory owner related information to maintain confidence.

A media distribution platform may be operable to present to advertisers or other content providers various scopes of advertising opportunities. For example, an advertising opportunity may include an entire commercial advertisement spot, meaning a programmatic distribution of a single asset to all viewers of a particular program on a particular channel at a given time. In some instances, an advertiser may be able to select an even broader scope such as airing the asset once during every advertising break on every channel available for a month. On the other end of the spectrum, an advertiser may be able to select very specific advertising opportunities such as a single impression. For example, a private jet broker may wish to purchase a single playback of an asset to one person who purchased a home worth over $10 M in the previous year. The available advertising opportunities may also encompass so-called SASO and MASO advertising opportunities. SASO (single advertiser spot optimization) refers to a model where a single advertiser purchases an entire advertising spot but directs different assets to different audience segments of the spot using an addressable advertising technology. MASO (multiple advertiser spot optimization) refers to a model where different advertisers purchase different audience segments within a single advertising spot and provide assets for those segments. The entire range of potential scope of advertising opportunities available for sale and presented to advertisers by a media distribution platform is contemplated.

The distribution platform also presents to content distributors proposed insertion orders. The content distributors can then accept, reject, or modify the orders. For example, a content distributor may reject an order based on ad quality, running length, or ad content. In other cases when distributors manage their own inventory, e.g., when the distribution platform handles aggregation orders that span multiple distributors, distributors might reject an order for business reasons. For example, as noted above, content providers may in some cases wish to target small audiences having a high value or CPM in addressable spots. However, due to limitations on the number of addressable spots available or the number of asset options that can be supported for a single spot, a content distributor might not be able to or wish to accommodate such a proposed order. Accordingly, the distribution platform and allocation processes preferably address such considerations, for example, by allowing content distributors to accept, reject, or modify proposed orders and/or by suggesting or directing proposed orders to optimize both content providers' budgets/goals and content distributors' revenues/goals.

In addition, the distribution platform may implement rules to manage distribution and inventory allocation as between content providers and as between content distributors. For example, managing asset distribution may entail balancing of competing interests, e.g., prioritizing or weighting certain asset options to ensure that pacing constraints are satisfied or to meet campaign goals for expiring campaigns. It is desirable that such decisions are and appear to be neutral in relation to competing content providers. Conversely, in some cases, such as where there is limited disk space or a limited number of asset channels to support addressable spots, content distributors may appear to be in competition for limited resources for content distribution. It is important that the distribution platform and associated systems are and appear to be neutral in allocating resources between content distributors.

Inventory allocation information may include any of a variety of characteristics or constraints associated with available advertisement opportunities. For example, a date and time during which the available advertisement opportunity is scheduled (if any, as there may not be a schedule associated with impressions), a requested price associated with the available advertisement opportunity, historical subscriber attribute information associated with programming content scheduled around the available advertisement opportunity (e.g., the audience that typically watches the television show scheduled around the advertisement break is typically retired married couples), limitations placed by the host (e.g., kid friendly assets only), etc. The advent of addressable advertising has enabled delivery of assets to users regardless of location. For example, traditionally, in an effort to target all voters inside a particular political boundary, some subscribers outside the political boundary inevitably received an asset that was not targeted toward them. This is because cable network infrastructure is typically not installed in accordance with political boundaries. However, a media distribution platform may be operable to deliver an asset only to subscribers residing within a political boundary, independent of network topology, or to deliver the asset to a subscriber residing within the political boundary regardless of current location.

A campaign target list may include a list of subscriber keys associated with selected subscribers. In this regard, selected subscribers may be those who are associated with a target attribute, as determined by a DMP, which satisfies or is included in a selected targeting attribute selected by an advertiser.

A data management platform may be further operable to maintain or have access to a database of device IDs which are associated with subscriber keys. In this regard, a subscriber key may be an encoded, encrypted, anonymous, or otherwise secure identifier associated with a subscriber that prevents revelation of personally identifiable information. Because a subscriber may own, use, or otherwise be associated with multiple devices (e.g., cell phone, set-top box, tablet PC, etc.), each unique subscriber key may be associated with multiple device IDs, each device ID unique to a particular device.

A campaign target list may comprise a list device IDs usable for addressing delivery of the asset to each respective electronic device. In this regard, each distribution network receiving insertion orders from a media distribution platform may receive a list of device IDs which enable the distribution network to address the asset to the respective device. In the alternative, a media distribution platform may simply transmit subscriber keys to the distribution networks and allow the distribution networks to determine which devices to target (as may be the case where a subscriber has multiple devices on a single distribution network).

Consumer information accessed by or stored within a data management platform, and used in identification or selection of targeted subscribers, may be any information related to a subscriber (i.e., potential consumer) and of interest to an advertiser. For example, consumer information may include at least one of credit score, loyalty program membership, income, past purchase data, gender, occupation, social media activity, requests for information submitted by the user to a distribution network, email lists, age, etc.

A media distribution platform may be further operable to receive reporting information from distribution networks. Reporting information may include affirmation that the asset was transmitted to at least one device associated with a given subscriber, affirmation that the asset was displayed on a particular device, or information indicating that a selected subscriber actively engaged the device during display of the asset.

A media distribution platform may also implement cross-platform or cross-network campaign management. Asset campaigns may define a number of distribution parameters such as frequency, pacing, total number of impressions, sequencing of a set of related assets, etc. The media distribution platform can manage these across platforms and networks such that, for example, an individual who may sometimes consume a given asset via television and other times consume an asset via a streaming device does not consume the asset too frequently, or the overall pacing of deliveries for an asset across multiple networks is managed to stay within campaign restrictions.

A media distribution platform may also account for asset skips or tune-aways. In time-shifted or streaming contexts, a subscriber may fast forward through or otherwise skip an asset.

Similarly, in connection with real-time broadcast programming, subscribers may tune-away from an asset or mute an asset. As noted above, such events may be captured in reports. The reports may, for example, indicate how much of an asset was consumed or identify a point of tune-away. This may be used both for analyzing ad effectiveness and for accounting. In the latter regard, different platforms may have different legacy rules for what counts as an impression or partial impression for purposes of billing advertisers. The media distribution platform may manage different rule sets and/or may define a common rule set for counting impressions.

A media distribution platform may include a settlements module. A settlements module may be configured to calculate an account balance of an advertiser or other party based upon received reporting information. For example, an advertiser may not be billed until after an asset has aired as verified by an auditor. In this regard, as confirmation of each individual asset is received at the media distribution platform via reporting information, the settlements module may update an account balance reflecting charges owed by the advertiser for the confirmed impressions. A settlements module may also be tasked with monitoring sums due from other market participants including distribution networks, ad agencies, sales channels, programmers, etc. For example, a revenue sharing agreement may be established within the media distribution platform for automatic allocation of received payments to a cable network and a satellite broadcaster based on an asset that has aired on the cable channel as distributed by the satellite broadcaster. In this regard, the media distribution platform may serve to administer the agreement.

A media distribution platform may further include an audit module. Such module may perform any relevant auditing function. For example, an audit module may be configured to provide a third-party auditor access to auditing data associated with the media distribution platform. Auditing data may be at least partially based upon received reporting information, campaign instructions, insertion orders, and other data received by or transmitted from a media distribution platform. Auditing data may be anonymized to prevent unauthorized access to personally identifiable information.

Further, a media distribution platform may include a programmatic buying extension. A programmatic buying extension may assist in bridging the gap between non-addressable and addressable systems. For example, a programmatic buying extension may be configured to analyze consumer information from the data management platform(s) and the received reporting information to estimate influence information associated with a non-targeted media asset. Influence information may be any data associated with the scope or attributes of an audience. Specifically, confirmed impressions of a given asset as aired during a particular television show may be used to estimate the number of subscribers having the same attribute or set of attributes that will receive a programmatic asset during the same television show at the same time or even at a later date. In this regard, reporting information from addressable asset impressions may serve as a more accurate proxy for traditional ratings information.

A media distribution platform may also include campaign optimization tools. Campaign optimization may define/refine targeting and/or flighting constraints for campaigns. These tools may be configured to analyze campaign instructions and associated reporting information to formulate suggested campaign instructions. In this regard, certain campaign instructions may yield undesirable results whereas other campaign instructions, from the same or another advertiser in the same industry, may yield favorable results. In response, campaign optimization tools may analyze the differences between the sets of campaign instructions to return to an advertiser a set of suggested changes that should be made to their campaign (e.g., 30-34 year-olds have 10% higher conversion rate than 35-39 year-olds and therefore more impressions of the younger age range should be purchased).

In addition, multiplatform attribution may be analyzed to optimize a mix of media used for distribution. For example, analysis may indicate that OTT impressions have a return on investment (ROI) of 10% and addressable and addressable linear may have an ROI of 15%. Combining this and other data including available inventory and expected reach, the distribution platform can optimize a campaign buy based in part on ROI.

Further a media distribution platform may include a creative distribution module. Such module may be configured to transmit an asset to distribution networks, with or without associated insertion orders. In this regard, the creative distribution module may be configured for secure and/or streamlined communication with distribution networks to transmit assets for which insertion orders have been generated by the media distribution platform.

It should also be appreciated that the above functionalities of a media distribution platform are considered applicable in all forms of advertising involving insertion of an asset into audio/video programming. An advertiser may purchase a given number of impressions and a media distribution platform may be configured to allocate those impressions over disparate distribution networks. For example, one subscriber of a traditional cable MVDP may be watching a given cable channel at a particular time. At the same time, a subscriber of an online streaming service may also be watching the same, or a different cable channel. Despite the use of different distribution networks, both subscribers may receive the same asset based upon consumer information determined by a data management platform of a media distribution platform.

Methods of distributing assets in accordance with above-described media distribution platform embodiments are also envisaged and considered within the scope of this disclosure.

BRIEF DESCRIPTION OF THE DRAWINGS

For a more complete understanding of the present invention and further advantages thereof, reference is now made to the following Detailed Description, taken in conjunction with the drawings, in which:

FIGS. 7-25 show a workflow and associated screen shots for a distribution process in accordance with the present invention; and FIG. 26 illustrates certain considerations related to balancing asset delivery in accordance with the present invention.

DETAILED DESCRIPTION

Figure 1:
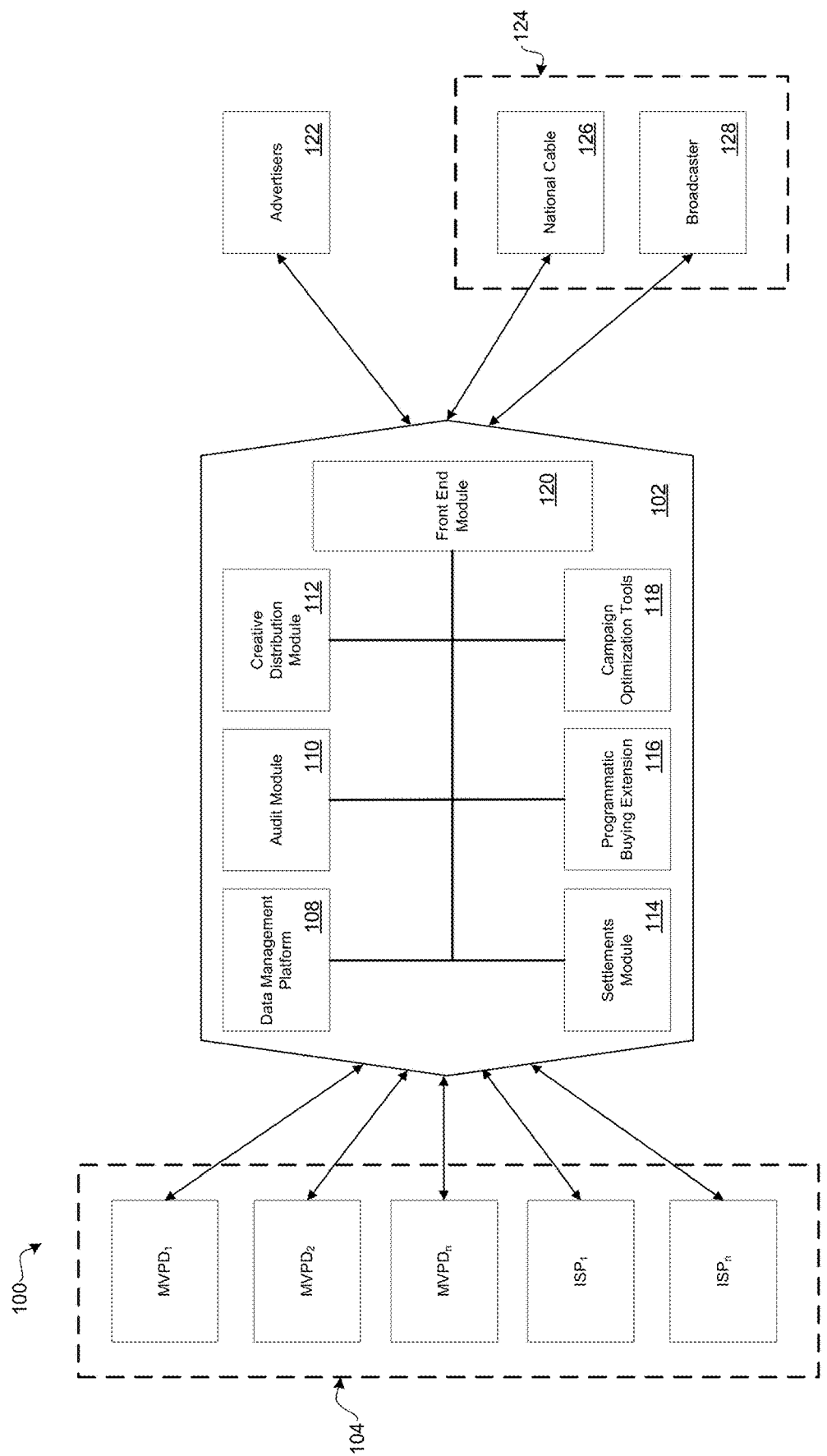
FIG. 1 is a block diagram of an embodiment of a media distribution platform for controlling and monitoring the distribution of targeted media assets in accordance with the present invention.

While the invention is susceptible to various modifications and alternative forms, specific embodiments thereof are shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 illustrates a block diagram of a system architecture 100 associated with a media distribution platform 102. It should be appreciated that the various modules illustrated and described as being included in media distribution platform 102 may each be optional, may each be co-located or may be geographically distributed, may be singular or plural, may be implemented on a single machine or distributed across multiple machines, and may or may not be co-owned. In this regard, certain modules such as DMP 108, audit module 110, creative distribution module 112, settlements module 114, programmatic buying extension module 116, campaign optimization tools 118, and front-end module 120 may be provided by third-party partners. Furthermore, additional components of a media distribution platform may be provided although not shown in the illustrated embodiment. For example, a distribution network module, processing engine and/or a memory module may be provided to facilitate the functionalities described herein.

Any number of distribution networks 104 and programmers 124, such as broadcaster 128 and national cable network 126, may be in operative communication with media distribution platform 102 to convey inventory allocation information such as availability of spots for insertion of assets, pricing associated with each spot, attribute information associated with predicted viewers of each spot, an anticipated total number of impressions available, etc. Distribution networks 104 may be any providers that distribute programming content.

In addition to inventory allocation information, distribution networks 104 may communicate subscriber keys, or any other identification information related to current or past subscribers, to media distribution platform 102. These subscriber keys may be used to retrieve consumer information from DMP 108. Such consumer information may comprise any data relevant to identifying candidate targets to receive the asset including, inter alia, demographics, purchasing history, credit reports, credit card and bank transactions, social media activity, RFI submissions, websites visited, travel history and plans, or other attributes.

Media distribution platform 102 may present to advertisers 122, via front end module 120 (which may include an API), inventory allocation information. This information may take any one of various forms and may include, but is not limited to, available spots, predicted available impressions and time constraints, aggregated consumer information, pricing, etc. In this regard, advertisers 122 may be able to sort, filter, and otherwise organize the inventory allocation information to identify, select, and purchase a desired block of insertion opportunities. For example, an advertiser may select an entire spot to purchase, in which case each subscriber of the relevant distribution network platform may receive the advertiser's asset. Additionally or alternatively, the advertiser 122 may select specific attributes or other constraints with campaign instructions. Aggregated consumer information comprising the total number of subscribers and/or impressions available across various classifications of targeting attributes may be used for aligning campaign instructions with impressions. For example, a tire manufacturer may select and purchase 5,000 impressions to males between the ages of 20-29 who purchased a new car between 3-5 years ago. In such an instance, the media distribution platform 102 may identify subscribers matching the campaign instructions and transmit insertion orders to one or more distribution networks 104, wherein such insertion orders collectively total the 5,000 impressions. The front-end module 120 may also provide an interface for advertisers 122 to upload their asset to the creative distribution module 112. The asset may be transmitted from the creative distribution module 112, along with the respective insertion orders, to the distribution networks 104.

Reporting information may be generated by user devices, such as set-top boxes, mobile phones, etc., and received by each respective distribution network 104. This reporting information may be used by each distribution network 104 to confirm delivery of each impression. If reporting information indicates a particular impression was not made (e.g., the asset failed to stream, the subscriber changed channels before the asset played, the subscriber powered off the device, etc.), the impression may be re-attempted by the distribution network 104. Upon verification of the total number of impressions assigned to a respective distribution network being made, in accordance with the reporting information, the distribution network 104 may cease delivery of the respective asset. In some instances, a media distribution platform 102 may over-assign impressions to distribution networks 104 to expedite a campaign. This may be desirable in the event that campaign instructions indicate a limited window of time for delivery. As an example, media distribution platform 102 may assign 1,000 impressions of an asset to each of eight distribution networks even though campaign instructions associated with the asset indicate only 5,000 total impressions. In this regard, the distribution networks 104 may transmit reporting information to media distribution platform 102 in substantially real-time (or at regular intervals) such that media distribution platform 102 may keep a running tally of the impressions made and/or confirmed by reporting information. Upon reaching the 5,000-impression total, the media distribution platform 102 may send instructions to each distribution network 104 to cease the campaign.

Following delivery of an asset by a distribution network 104, media distribution platform 102 may compile reporting information from a plurality of distribution networks 104. This information may be communicated to the respective advertiser 122 and may include such information as specific attributes of subscribers that received the asset, dates and times of delivery, content into which the asset was inserted, etc. Compiled reporting information may also be utilized for auditing and settlements.

Audit module 110 may be tasked with verification that the reporting information indicates compliance with the campaign instructions. For example, if campaign instructions specify that 20-29 year-olds should be targeted, but the reporting information indicates that at least a portion of the impressions made were to subscribers outside that age band, audit module 110 may initiate the transmission of additional insertion orders to the respective distribution network 104 and/or may provide an indication to settlements module 114 that the price to be invoiced to the advertiser 122 should be adjusted accordingly. The settlements module 114 can settle amounts owed as between, for example, content owners and distributors in connection with ad deliveries.

Audit module 110 may also be tasked with independently verifying accurateness of reporting information. For example, auditing module 110 may provide access to reporting information to a third-party auditor. Such auditor may independently poll subscribers, have access directly to device reporting data, or may otherwise verify delivery of a statistical sampling of subscribers to verify that reporting information received from distribution networks 114 is accurate.

Reporting information and consumer information may be analyzed by campaign optimization module 118. The campaign optimization module 118 may produce recommendations for improved campaign performance. For example, algorithms may be used to identify campaign instruction and reporting information metrics which are associated with high conversion rates. This information may then be used to alter a campaign or to provide suggestions to advertisers 122 to increase conversion rates.

Programmatic buying extension module 116 may be operable to facilitate improved targeting of programmatic asset insertion based upon addressable insertion reporting. In this regard, reporting information pertaining to addressable impressions may be analyzed by the media distribution platform 102 to predict viewing audiences associated with various programming content. Equipped with this information, programmatic buying extension 116 may provide insight into which particular spots should be purchased by an advertiser 122 to satisfy their campaign instructions. For example, $MVPD_1$ may be an addressable distribution network which distributes a particular cable network. Reporting information from $MVPD_1$ may be used to determine what percentage of the viewing audience fit a particular demographic during a television show aired on the cable network. Using that information, an advertiser 122 may identify that particular television show as a candidate for insertion of an asset on $MVPD_2$ which may be a programmatic distribution network which also distributes the particular cable network. In this regard, the relatively specific reporting information from an addressable distribution network may be used in lieu of or in addition to ratings information which is typically less accurate.

Figure 2:
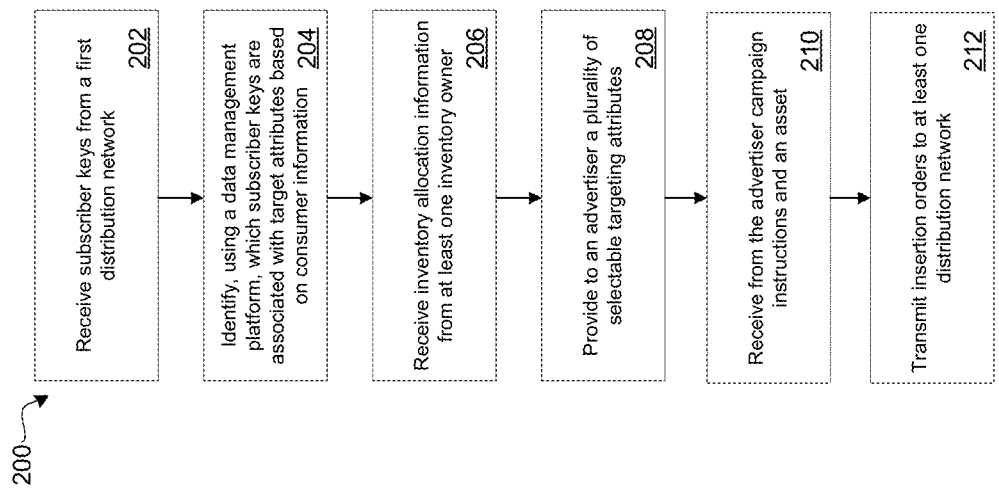
FIGS. 2-4 are flow charts illustrating methods of distributing an asset in accordance with the present invention.

FIG. 2 illustrates a method of distributing an asset. A media distribution platform may receive a plurality of subscriber keys from at least one distribution network 202. The distribution network may be any distributor of programming content. Utilizing a data management platform, the media distribution platform may identify which of the subscriber keys are associated with target attributes based on consumer information (e.g., which subscribers are associated with the target attributes) 204. In this regard, the data management platform may access one or more databases containing consumer information. The consumer information may be stored in conjunction with subscriber identification information (e.g., name, address, etc.). In this regard, the data management platform may reference a table or database to determine identification information associated with the respective subscriber key. Using the identification information, the data management platform may retrieve consumer information pertaining to the identification information. To illustrate, a data management platform may receive a first subscriber key. The data management platform may access a database to retrieve an address associated with the subscriber key. Using the address, the data management platform may retrieve consumer information such as vehicle registrations, home purchase price, age, etc. Alternatively, consumer information may be stored in relation to the subscriber key to which it corresponds. In this regard, the data management platform may be operable to retrieve consumer information directly based upon the subscriber key rather than referencing a table or database to retrieve subscriber identification information. In either case, each subscriber key received by at least one data management platform may be associated with various forms and pieces of consumer information to be used in selecting subscribers to target with an asset.

A data management platform may receive inventory allocation information from at least one inventory owner 206. Inventory allocation information may include availability of spots and/or impressions in programming content. For example, cable network may submit to the media distribution platform inventory allocation information including list of upcoming ad breaks and demographic information traditionally associated with programming content surrounding each ad break. Alternatively or additionally, a distribution network may submit inventory allocation information including a number of impressions (which in some instances may be estimated) available and timing associated therewith.

A data management platform may provide to one or more advertisers a plurality of selectable targeting attributes 208. The selectable targeting attributes may correspond to consumer information that has or is anticipated to be identified by the data management platform. For example, selectable targeting attributes may include gender, location, age, hobbies, purchased goods (e.g., car, computer, etc.), or any other ascertainable consumer information that may be of interest to an advertiser. The selectable targeting attributes may be harmonized as discussed above to provide a coherent selection scheme to advertisers for distribution across multiple distribution networks.

An advertiser may submit campaign instructions and an asset via a front-end module of the data management platform 210. Campaign instructions may include a selection of one or more of the selectable targeting attributes, an agreed upon pricing structure, timing and other constraints, etc. Based on the campaign instructions and received asset, the media distribution platform may transmit insertion orders to at least one distribution network 212. The media distribution platform may be operable to automatically identify subscribers or subscriber keys associated with target attributes which correspond to the selectable targeting attributes in the campaign instructions. There are at least two modes of operation for generating and executing insertion orders. First, inventory owners may sell their own inventory and then the distributors enable execution of the orders in a prescribed fashion. This would be the case, for example, in the case of a content provider who uses the distributor facilities. In a second mode of operation, inventory owners may pool their inventory for sale by one of the inventory owners or a third party. For example, this may be how distributors sell local inventory (e.g., the two minutes an hour of local advertising) in pooled contexts (e.g., if Dish™ and DirecTV™ jointly sold political ads).

In the latter case, upon identifying the subscribers (or keys), the media distribution platform may generate the insertion orders for one or more distribution networks. In this regard, the media distribution platform may be operable to optimize allocation of impressions in accordance with the campaign instructions. For instance, optimization may be based upon pricing, conversion rates, subscriber base composition, etc. To illustrate, an advertiser may submit campaign instructions indicating 500,000 males are to receive one impression of the asset each. A first distribution network may have submitted inventory allocation information comprising availability of impressions to 300,000 males at a designated price per impression. A second distribution network may have submitted inventory allocation information indicating availability of impressions to 300,000 males at a higher price per impression. The media distribution platform may be operable to optimize the allocation of impressions requested in campaign instructions by assigning 300,000 impressions to the first distribution network and 200,000 impressions to the second distribution network to minimize the cost to the advertiser while complying with the campaign instructions.

Figure 3:
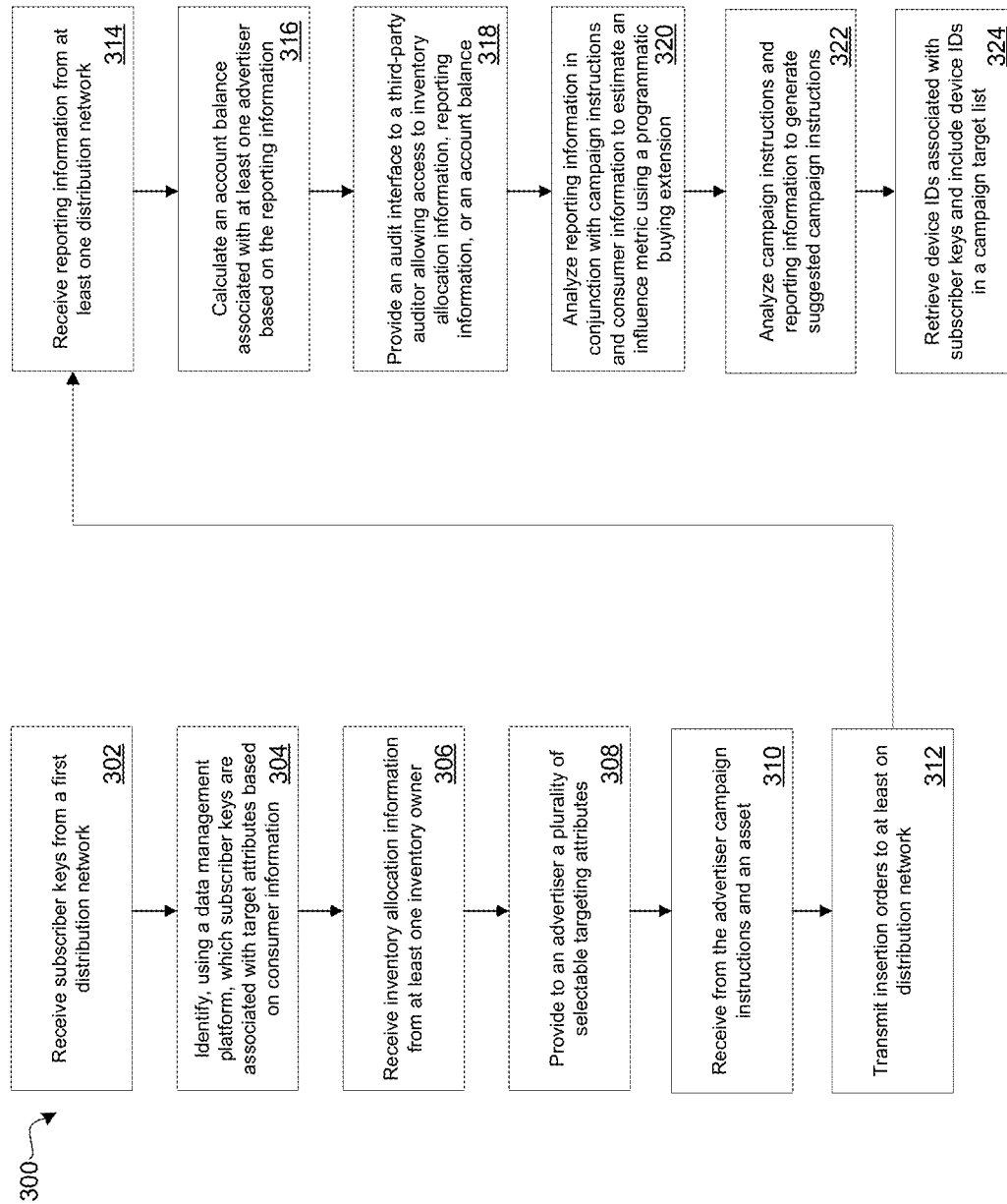

FIG. 3 illustrates another method of distributing an asset. Steps 302-312 may directly correspond to steps 202-212 of FIG. 2 discussed above. Notably, steps 314 through 324 may each be optional and may be performed in an order that is not reflected in FIG. 3. At step 314, the media distribution platform may receive reporting information from at least one distribution network that has previously received insertion orders and a corresponding asset. Reporting information may include confirmation of delivery to each targeted device, information regarding subscriber interaction during display of the asset, any other information received from set top boxes or other devices, etc.

The reporting information may be implemented to harmonize processing of reporting information across content distributors. As noted above, some MVPDs or other content distributors may monitor asset deliveries to identify asset skip events, tune-aways, or indications of interest or lack thereof, among other things, and may have legacy rules concerning what deliveries count as an impression. Similarly, some content distributors may receive an indication of what portion of an asset was delivered, e.g., based on substantially real-time tuning status information. The media distribution platform may process such reporting information so as to define a common definition of impressions or a common "currency" for counting impressions, for example, that a delivery will only count as an impression if it is fully delivered at the user equipment, if a majority of the asset was delivered, if the demographics of the audience sufficiently match the targeting parameters for the asset, etc. Alternatively, the media distribution platform may manage multiple definitions of what constitutes an impression and individual content providers and content distributors may agree on which definition will apply for a given campaign or campaign line. It will be appreciated that providing a system-wide definition of impressions allows for efficient processing across content providers and content distributors as well as facilitating audience estimations and measurement. Thus, the processing of reports may involve controlling reporting platforms to provide standardized reports and/or receiving unstandardized reports and interpreting the reports or underlying information to derive standardized impression information.

Based upon the reporting information, the media distribution platform may calculate a billing account balance associated with the advertiser. The balance may reflect, inter alia, the number of impressions delivered, the accuracy of the targeting (e.g., 95% accuracy may indicate that 5% of the impressions were delivered to subscribers that do not match the selected targeting attributes), agreed upon pricing, and price adjustments made based upon compliance with campaign instructions. In addition, a settlements module or another component of the media distribution platform may be utilized to settle amounts owed between content providers/inventory owners and the distributors where, for example, the inventory owners pay the distributors for use of their infrastructure on a CPM basis.

A third-party auditor may be provided access to data associated with the media distribution platform via an audit interface 318. The auditor may be tasked with verification of information to assure compliance with agreed upon terms. For example, the auditor may review reporting information in conjunction with a statistical sampling of survey participants selected from a subscriber base. If a statistically significant anomaly is detected between the survey results and the reporting information, the auditor may notify one or more participants (e.g., operator of the media distribution platform, a distribution network, an advertiser, etc.).

A programmatic buying extension may be operable to analyze reporting information in conjunction with campaign instruction and consumer information to estimate an influence metric 320. In this regard, reporting information and consumer information received in response to the distribution of an addressable asset may be utilized to generate predicted influence of an asset. For example, a first asset may be distributed in an addressable manner. Characteristics of the distribution of the first asset may be informative in distribution of a second, non-addressable asset, for instance based on identification of programming content into which the first asset was inserted. This is described, for example, in U.S. patent application Ser. No. 15/043,493 entitled, "Predictive Programmatic System for Audience Identification and Analysis," which is incorporated by reference herein.

Campaign optimization tools accessible by the media distribution platform may be used to analyze campaign instructions, reporting information, and consumer information to generate suggested campaign instructions 322. In this regard, the media distribution platform may ascertain, based upon reporting information, characteristics of the distribution of an asset and utilize those characteristics to optimize future impressions or campaigns. As one example, an asset may be distributed to subscribers during three different television shows. The media distribution platform may access consumer information to determine that viewer of one of the three television shows had a higher conversion rate than viewers of the other two television shows. In turn, the media distribution platform may generate suggested campaign instructions indicating that more impressions should be channeled to the first of the three television shows. As a further example, post campaign analysis may indicate that, for a particular demographic (e.g., women aged 18-34), the campaign was oversold for television and undersold for OTT. That information may be used in creating future campaigns. The suggested campaign instructions may be implemented by the media distribution platform automatically or may be presented to the corresponding advertiser for approval.

Figure 4:
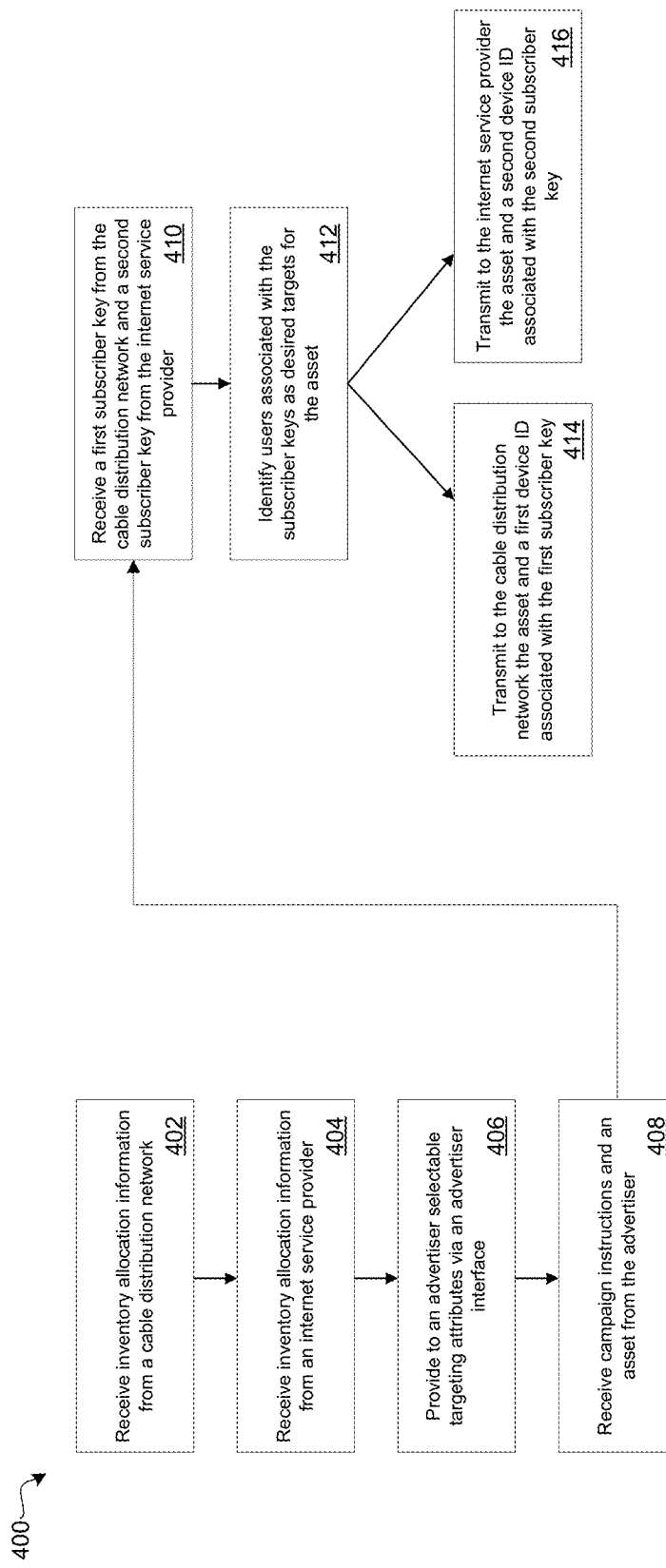

FIG. 4 illustrates a method of distributing an asset. The method may be similar to that discussed in relation to FIGS. 2 and 3 above, but specifically involving distinct distribution networks. In the example illustrated, the distribution networks are a cable distribution network and an internet service provider, although it should be appreciated that any combination of distribution networks may be utilized.

The media distribution platform may receive inventory allocation information from a cable distribution network 402 and inventory allocation information from an internet service provider 404. An advertiser may be presented selectable targeting attributes via an advertiser interface 406. The media distribution platform may then receive campaign instructions and an asset from the advertiser 408. A first subscriber key may be received from the cable distribution network and a second subscriber key may be received from the internet service provider 410. The subscriber keys may be utilized by a data management platform to identify subscribers (e.g., users) as desired targets for the asset based upon consumer information associated with the subscribers or subscriber keys 412. Based on identification (or confirmation) of the subscriber keys being associated with desired targets, the media distribution platform may transmit the asset and insertion orders to distribution networks indicating availability of impressions corresponding to the campaign instructions. For example, the media distribution platform may transmit the asset and insertion orders comprising a device ID associated with the first subscriber key to the cable distribution network 414 and also may transmit the asset and insertion orders comprising a device ID associated with the second subscriber key to the internet service provider 416. Notably, the subscriber keys may be transmitted in lieu of the device IDs and the respective distribution networks may identify the device IDs based upon the subscriber keys.

The following use cases are provided to illustrate potential real-world uses of a media distribution platform. They are intended to be exemplary only and should not be considered limiting.

Use Case #1

A cable distribution network may submit inventory allocation information to a media distribution platform indicating that, based on historical usage, it estimates an available 50 million impressions next month. The cable distribution network may also submit a list of subscriber keys associated with subscribers to its television service.

A mobile data distribution network may submit inventory allocation information to the media distribution platform indicating that, based on historical usage, it estimates an available 30 million impressions next month. The mobile data distribution network may also submit a list of subscriber keys associated with subscribers to its mobile data service.

The media distribution platform may then process the subscriber keys from both networks using a data management platform to retrieve, identify, and associate subscriber keys with target attributes. For example, each subscriber key may be added to a table that lists each subscriber key's corresponding age, address, income, purchases, gender, familial status, credit score, etc. Notably, some consumer information may be unavailable for some subscriber keys in which case that field may be left blank or filled with a placeholder.

A list of selectable targeting attributes may be generated and presented to an advertiser via an advertiser interface. The list, in some cases, may be generated in response to attributes identified by the data management platform such that the list directly corresponds to the retrieved consumer information. In other cases, the list may be a standardized list used by the media distribution platform. As an example, an advertiser may access the media distribution platform to purchase impressions. The advertiser's user may see a list of selectable targeting attributes corresponding to the target attributes discussed above (e.g., age bands, geographic areas (may be a map on which regions can be selected or user may draw a boundary line to select subscribers inside the boundary), income bands, product categories, gender, familial status categories, credit score bands, etc.).

The advertiser's user may select 30,000 impressions in the Philadelphia area and 30,000 impressions in the Dallas area wherein the impressions are to be made to any given user no more than two times, regardless of distribution partner, platform, or device. Accordingly, campaign instructions may be created by or received at the media distribution platform comprising these criteria along with an asset comprising a commercial advertisement about the advertiser. Based on the selected targeting attributes, the media distribution platform may identify subscriber keys associated with subscribers that fit the criteria of the campaign instructions.

Based on the inventory allocation information and/or data management platform databases, the media distribution platform may determine that the cable distribution network is suited to deliver impressions in Philadelphia where the cable distribution network has infrastructure but is not suitable to deliver impressions in Dallas where it does not provide service. Similarly, the media distribution platform may determine that the mobile data distribution network provides mobile data network coverage in both cities and is therefore suited to deliver impressions in both locations. Accordingly, the media distribution platform may generate and transmit insertion orders to the cable distribution network instructing the delivery of 20,000 impressions of the asset to subscribers in Philadelphia wherein no subscriber is to receive the impression more than twice (e.g., they will not be compensated for additional impressions). The media distribution platform may also generate and transmit insertion orders to the mobile data distribution network instructing the delivery of 10,000 impressions in Philadelphia and 30,000 impressions in Dallas with a maximum compensable delivery of two impressions per each subscriber. It should be appreciated that the allocation of impressions in the insertion orders may be divided in any manner that satisfies the criteria of the campaign instructions. The specific example given is exemplary only. Notably, the insertion orders may include the subscriber keys associated with the targeted subscribers or may include device IDs corresponding to specific devices (e.g., set top boxes for the cable distribution network and mobile phones or tablets for the mobile data distribution network).

The insertion orders may include an exact number of subscriber keys (or device IDs) corresponding to the allocated number of impressions or may include a surplus amount to ensure timely delivery. For example, although the cable distribution network may be allocated exactly 20,000 impressions to Philadelphia, the insertion orders may include 10,000 subscriber keys for delivery of two impressions each or may include 100,000 subscriber keys such that the cable distribution network may deliver impressions on a first available basis. In the latter case, upon receiving reporting information confirming delivery at 20,000 devices, the cable distribution network may cease transmission of the asset.

Reporting information from the cable distribution network may be received at the media distribution platform and utilized by various modules. For instance, a billing module may receive reporting information indicating that the cable distribution network delivered 12,000 impressions to unique subscribers and 10,000 impressions were delivered to 10,000 of those same users. In such an instance, the settlements module may determine that 2,000 impressions are non-compensable for exceeding the 20,000 allocated impressions. Accordingly, the settlements module may calculate an account balance corresponding to 20,000 impressions to be paid to the cable distribution network by the advertiser at a price set by the cable distribution network and displayed to the advertiser's user via the advertiser interface during generation of the campaign instructions. Reporting information may also be received from the mobile data distribution network and utilized in a similar manner. In certain cases, overdelivery could be a settlements issue handled by a settlements module. For example, certain inventory owners may pool their inventory and provide a set number of impressions against the order. In such cases, in the event of an overdelivery (and depending on the applicable business rules), the seller may pay the inventory owner who in turn pays the distributors.

An auditing module of the media distribution platform may also analyze reporting information to confirm accuracy. For example, an auditor may conduct a survey of a sampling of the subscribers whose subscriber keys were included in the insertion orders. If a statistically significant anomaly is discovered, parties may be notified for further investigation.

Use Case #2

A cable distribution network may submit inventory allocation information to a media distribution platform indicating that it has a programmatic spot available during an upcoming airing of a new episode of a popular television show on a Sunday night during prime time.

A mobile data distribution network may submit inventory allocation information to the media distribution platform indicating that it has an available 30 million impressions next month. The mobile data distribution network may also submit a list of subscriber keys associated with subscribers to its mobile data network.

The media distribution platform may then process the subscriber keys from the mobile data distribution network using a data management platform to retrieve, identify, and associate subscriber keys with target attributes.

A list of selectable targeting attributes may be generated and presented to an advertiser via an advertiser interface. As an example of an advertiser being presented with a list of selectable targeting attributes, a car manufacturer may access the media distribution platform to purchase impressions. The car manufacturer's user may see a list of selectable targeting attributes corresponding to the target attributes discussed above (e.g., age bands, geographic areas (may be a map on which regions can be selected or user may draw a boundary line to select subscribers inside the boundary), income bands, product categories, gender, familial status categories, credit score bands, etc.).

The car manufacturer's user may select 500,000 unique impressions nationwide to truck owners during the upcoming Sunday night prime time. Accordingly, campaign instructions may be created by or received at the media distribution platform comprising these criteria along with an asset comprising a commercial advertisement about the car manufacturer's truck models. Based on the selected targeting attributes, the media distribution platform may identify subscriber keys associated with the mobile data distribution network subscribers that fit the criteria of the campaign instructions.

Based on the inventory allocation information and/or data management platform databases, the media distribution platform may determine that the mobile data distribution network is suited to deliver addressable impressions but may estimate that less than 500,000 unique subscribers that are truck owners will stream programming content on the mobile data distribution network during primetime on Sunday night. Accordingly, the media distribution platform may determine that the available cable distribution network spot may be used programmatically to supplement the expected deficiency of the mobile data distribution network. Accordingly, the media distribution platform may generate and transmit insertion orders to the mobile data distribution network instructing the delivery of all available impressions of the asset to during the selected period of time. The media distribution platform may also generate and transmit insertion orders to the cable distribution network instructing the insertion of the car manufacturer's asset into the programmatic spot.

Reporting information from the mobile data distribution network may be received at the media distribution platform and utilized to determine that the mobile data distribution network delivered 270,000 impressions of the car manufacturer's asset during the time window. The reporting information may also be analyzed to determine that of those 270,000 impressions, 120,000 of them occurred during the airing of the popular television show. The media distribution platform may determine that the 120,000 truck owners represent 40% of the total the mobile data distribution network viewers that watched the popular television show. Accordingly, the media distribution platform may appropriately estimate that 40% of the total cable distribution network viewers that watched the popular television show are likely also truck owners. The total number of cable distribution network viewers that watched the popular television show may be determined by any appropriate means such as Nielsen ratings. Assuming that 800,000 cable distribution network subscribers watched the popular television show, it may be assumed that 320,000 truck owners received impressions of the car manufacturer's ad on the cable distribution network. Accordingly, the settlements module may calculate an account balance corresponding to 270,000 impressions to be paid to the mobile data distribution network by the car manufacturer. The media distribution platform may also calculate a number of impressions are payable by the car manufacturer to the cable distribution network somewhere between 230,000 impressions (i.e., 500,000 requested impressions minus the 270,000 impressions by the mobile data distribution network) and 320,000 impression (i.e., the estimated number of impressions made to truck owners by the cable distribution network).

An auditing module of the media distribution platform may also analyze reporting information to confirm accuracy. For example, an auditor may conduct a survey of a sampling of the cable distribution network subscribers to confirm the accuracy of the 40% estimation.

Figure 5:
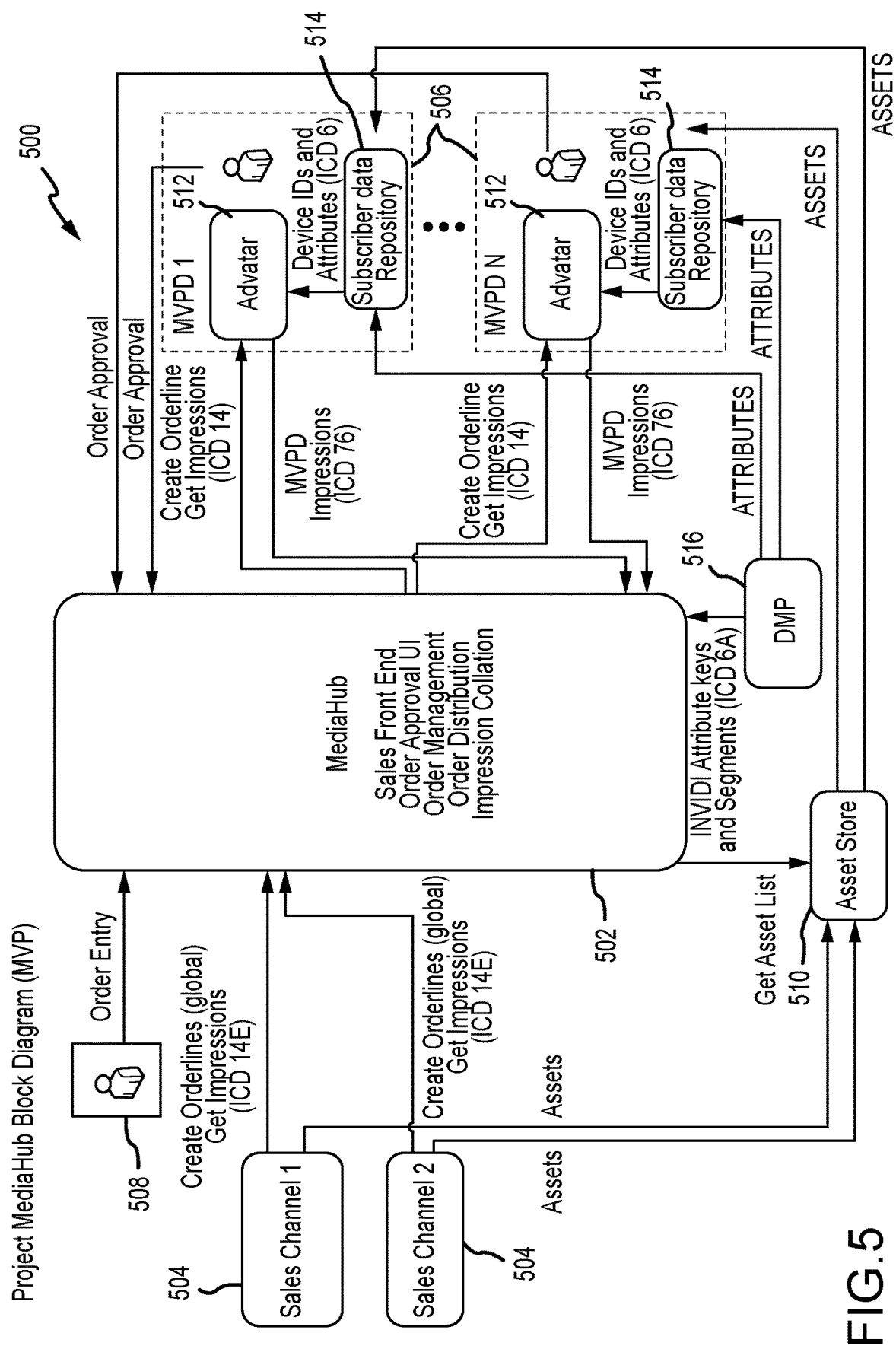
FIG. 5 shows a block diagram of a distribution system in accordance with the present invention.

FIG. 5 is a block diagram showing certain components and functionality of a further distribution system, denoted the MediaHub™ system 500, in accordance with the present invention. The system 500 includes a distribution platform 502 that connects content providers, such as advertisers and/or sales channels 504, with content distributors such as OTT distributors and/or MVPDs 506. As described below, the platform 502 implements a variety of functionality in this regard including providing a sales front end, providing a user interface for order approval, distributing orders, managing campaigns and collating impressions in relation to various content distributors. The system 500 is illustrated in the context of campaigns executed across multiple MVPDs 506 but it will be appreciated that other types of content distributors may be involved. In addition, the illustrated system 500 is described in the context of executing impression-based campaigns in connection with addressable asset delivery applications, however, it will be appreciated that the system can facilitate and manage a variety of types of campaigns.

A campaign may be initiated by an advertiser or agent accessing the platform 502 from a user terminal 508. As described below, this may involve campaign creation, campaign definition, and campaign modeling. In conjunction with creating campaigns, sales channels 504 may access the platform 502 to create orderlines and may further provide assets to an asset store 510. Each of the illustrated MVPDs 506 includes an addressable asset delivery system 512 such as the Advatar® system of Invidi Technologies Corporation, and a subscriber data repository 514. The addressable asset delivery system 512 provides a variety of functions related to facilitating, managing, and executing addressable asset delivery. In the illustrated system 500, the platform 502 provides orderlines to the systems 512 of the MVPDs 506 and the systems 512 can approve, reject, or potentially modify such orders. For example, orders may be accepted or rejected based on available inventory of asset delivery opportunities or other considerations.

The illustrated system 500 further includes a DMP 516. As discussed above, the DMP 516 generally has detailed demographic and consumer information regarding individuals or households, including subscribers of the MVPDs 506. The DMP 516 can provide attributes regarding subscribers that are stored in the subscriber data repository 514 as well as attributes and audience segmentation information to the platform 502. The DMPs 516 may also provide purchasing or other information for use in analyzing asset effectiveness. As described above, keys may be used in this regard to protect personally identifiable information. The system 512 obtains device identifications and attributes from the repositories 514 to deliver impressions for specific orders. The delivered impressions are then reported to the platform 502 which combines the reports from the MVPDs 506 to monitor campaigns (e.g., to track frequency, pacing, and total number of impressions), enable campaign analysis (e.g., based on asset skips, tune-aways, fulfillments, etc.), and billing.

In order to monitor campaigns across multiple content distributors, e.g., to monitor pacing, sequencing, total number of impressions or other campaign parameters across multiple distributors, the system may allow controlled, secure commingling of certain information. For example, a content provider may specify a pacing constraint that is to be monitored over all content distributors. To monitor that pacing constraint, the system can aggregate report information across all content distributors or specified content distributors. Of course, information of individual content distributors concerning campaign deliveries, pricing and the like need to be protected against disclosure to competitors and other service providers. Similarly, information of content distributors may be securely aggregated for certain purposes such as audience estimation. Accordingly, the processing platform provides a secure, centralized platform for such processing and the information may be anonymized, aggregated and otherwise protected as appropriate to ensure confidentiality and confidence by all parties. Moreover, content providers and content distributors may have access to different information. For example, content providers may need to have access to demographic, purchasing or other personal information, at least in an aggregated form, whereas content distributors may not need access to such information.

Figure 6:
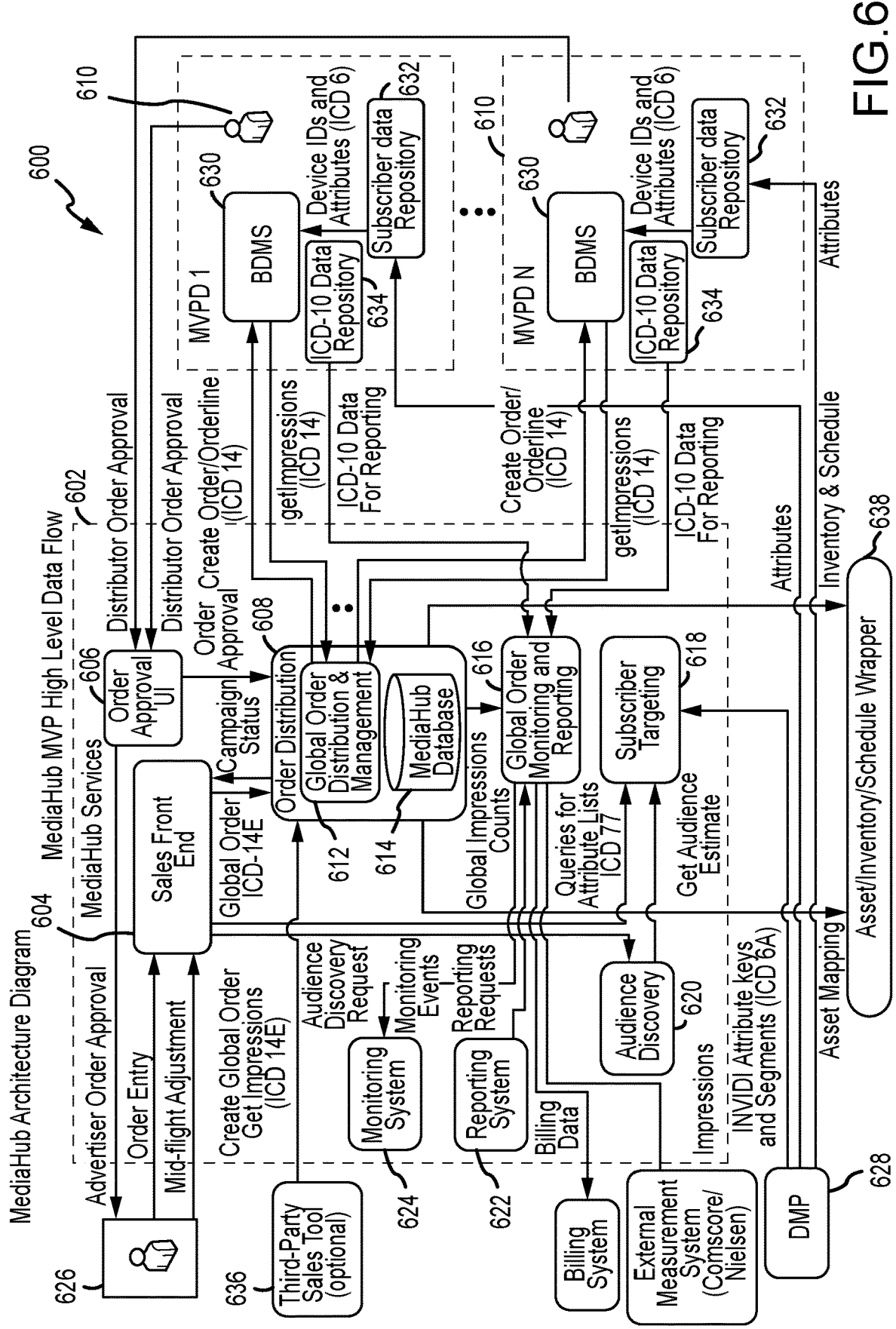
FIG. 6 shows an architecture diagram of a distribution system in accordance with the present invention.

FIG. 6 is an architecture diagram of a MediaHub system 600 in accordance with the present invention. The system 600 generally includes a media distribution platform 602 for executing a variety of functionality related to connecting content distributors to content providers. The illustrated platform 602 generally includes a sales front end 604 for defining campaigns and placing orders, an order approval user interface module 606 used by MVPDs 610 to accept or reject orders, and an order distribution module 608 for distributing orders to MVPDs 610 and managing campaigns. The module 608 includes a global order distribution and management function 612 for executing distribution and management functions and a MediaHub database 614 that stores various types of information required by the platform 602. The illustrated platform 602 further includes a global order monitoring and reporting module 616, a subscriber target module 618, an audience discovery module 620, a reporting system 622 and a monitoring system 624, the functions of which are described below.

A high-level data flow of the system 600 is shown in FIG. 6. A user platform 626 can be used to enter orders via the sales front end 604 as well as to enter mid-flight adjustments. The platform 608 may also include an interface with third-party sales tools 636 for receiving order information. The orders may define a campaign including, for example, campaign parameters (e.g., total impressions, audience definitions, desired content distributors, etc.). Mid-flight adjustments may include re-defining campaign parameters after the campaign has begun, for example, based on reviewing interim campaign results or analytics provided by the platform 602.

The sales front end 604 further communicates campaign parameters to the audience discovery module 620 which can estimate audiences for the campaign based on, among other things, analysis of historical campaign information. In addition, the sales front end 604 queries the subscriber targeting module 618 for attribute lists. The subscriber targeting module 618 uses the audience estimate information, together with campaign information from the sales front end 604 and attribute keys and audience segments for individuals and households from DMP 628 to identify attributes to be targeted. The sales front end 604 generates orders and provides orders to the order distribution module 608 which, in turn, transmits orders to the MVPDs 610. The MVPDs 610 approve or reject orders via the order approval user interface module 606 and approved orders are reported to the module 608.

The MVPDs 610 include a Business Data Management Service (BDMS) 630, a subscriber data repository 632, and a reporting data repository 634. The BDMS 630 manages delivery of impressions to subscribers. In this regard, the BDMS 630 receives orders, accesses the subscriber data repository 632, matches assets to subscribers, and controls user devices to deliver matching assets to subscribers. The BDMS 630 also receives reports from the user devices and stores reporting data in repository 634.

The subscriber data repository 632 stores information regarding subscribers. For example, the repository 632 may receive information regarding demographics, income, purchasing behavior, and the like from DMP 628. This information can be used to match subscribers or households to assets based on the targeting parameters of the assets. The reporting data repository 634 stores information, e.g., aggregated reporting data from the subscriber devices, and reports that information to the global order monitoring and reporting module 616. The reports may be used by the monitoring system 624 to monitor campaigns, e.g., for compliance with frequency, pacing, total number of impressions, etc. for the campaign. In this regard, campaigns may be monitored across multiple inventory distributors to ensure global compliance with such campaign parameters. To facilitate such management across multiple content distributors, a common definition of what constitutes an impression may be employed. The reporting system 622 may also query the module 616 to receive reports, e.g., for campaign analysis. The illustrated system 600 also includes an asset/inventory/schedule wrapper 638. The sales front end 604 may provide asset mapping information to the wrapper 638 and the order distribution platform 608 may provide inventory and schedule information to the wrapper 638.

Figure 7:
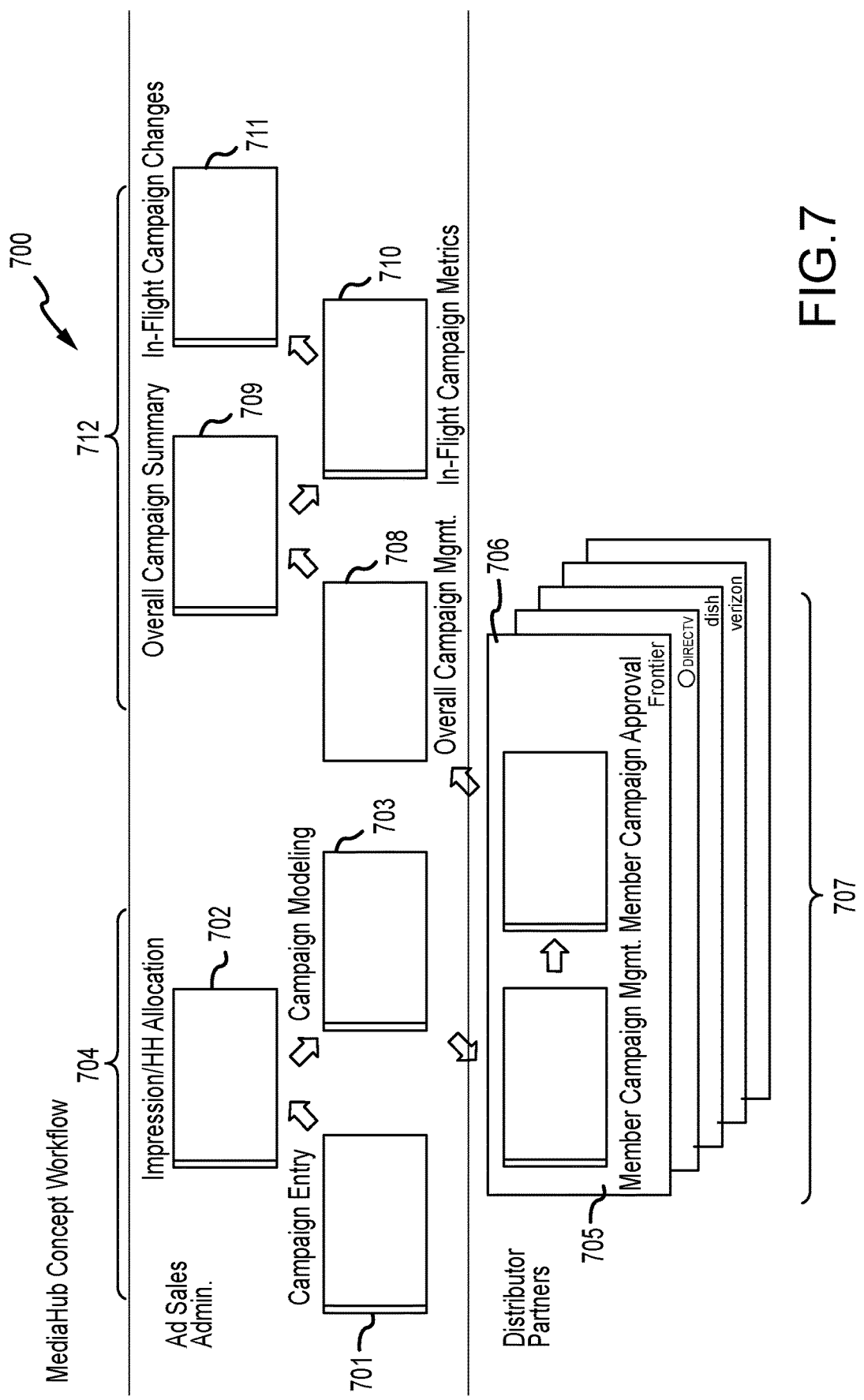

FIGS. 7-25 illustrate one example of a workflow 700 that may be implemented in connection with a distribution platform in accordance with the present invention. Specifically, FIG. 7 provides an overall summary of the workflow 700 and FIGS. 8-25 show examples of user interfaces that may be provided in connection with various steps of the workflow 700. As shown in FIG. 7, the workflow 700 generally encompasses a campaign creation portion 704, a campaign approval portion 707, and a campaign management portion 712. The workflow steps illustrated in FIG. 7 are generally distributed across a sales administrator, shown in the top panel, and distribution partners, shown in the bottom panel. Although not shown in FIG. 7, the workflow 700 may also encompass a variety of post-campaign functions such as campaign analysis, billing, and the like.

Referring to FIG. 7, the campaign creation portion 704 includes campaign entry 701, campaign definition 702, and campaign modeling 703. Generally, campaign entry 701 relates to entry of a campaign name and identifying information for the campaign. Campaign definition 702 may encompass a variety of factors relating to defining the nature of the campaign, goals of the campaign, duration of the campaign, a targeted audience, and desired distribution channels. Campaign modeling 703 involves predictive modeling of the campaign based on information input by the sales administrator. This may include distribution of impressions over the time period of the campaign as well as expected impressions to be delivered via different distribution channels. This may also include expected sales results and ROI. Though the workflow 700 is conceptually illustrated as a linear process, it will be appreciated that the campaign may be defined in an iterative process involving revisions to campaign parameters based on feedback from the campaign modeling 703.

After a campaign has been created, campaign orders are circulated to distribution partners, such as MVPDs and OTT service providers, for approval. In the illustrated workflow 700, the campaign approval portion 707 includes downloading campaign orders to a member campaign management application 705 and receiving member campaign approvals or rejections 706. As will be described in more detail below, the member campaign management application 705 displays information regarding current and proposed campaigns of a member including status information for the campaigns. Campaigns needing approval will be displayed in an interface of the application with status information such as "proposed" or "received." Once the proposed order has been acted on, the status may be changed to "approved" or "pending." As discussed above, once the campaign is approved or rejected, such status may be reported to the distribution platform. To approve a proposed campaign order, the distribution partner may select the proposed order to open an approval screen 706. On the approval screen, the distribution partner can review details of the proposed campaign order and elect to approve or reject the order.

Once a campaign order has been approved by a distribution partner, the approval is reported to a sales administrator via the distribution platform and the workflow 700 proceeds to the campaign management portion 712. The illustrated campaign management portion 712 includes an overall campaign management screen 708, an overall campaign summary screen 709, an in-flight campaign metrics screen 710 and an in-flight campaign changes screen 711. As noted above, approved campaign orders are reported to the sales administrator such that status information can be updated on an overall campaign management screen 708. The screen 708 can thereafter be used to track the status of the campaign in relation to the distribution partners who have approved campaign orders. During the campaign, an overall campaign summary screen 709 can be used as a kind of dashboard to monitor progress towards campaign goals. More detailed metrics concerning particular campaigns can be reviewed via an in-flight campaign metrics screen 710. For example, the screen 710 may display the allocation of distributions as between the various distribution partners as well as overall progress towards identified campaign goals. Occasionally, for example, based on reported in-flight metrics, it may be desired to make in-flight campaign changes. In-flight campaign changes refer to changes in campaign parameters during the course of the campaign, for example, to address shortcomings or excesses related to frequency, pace, and overall impressions, among other things. Such in-flight campaign changes may be entered via campaign changes screens 711.

Figure 8A:
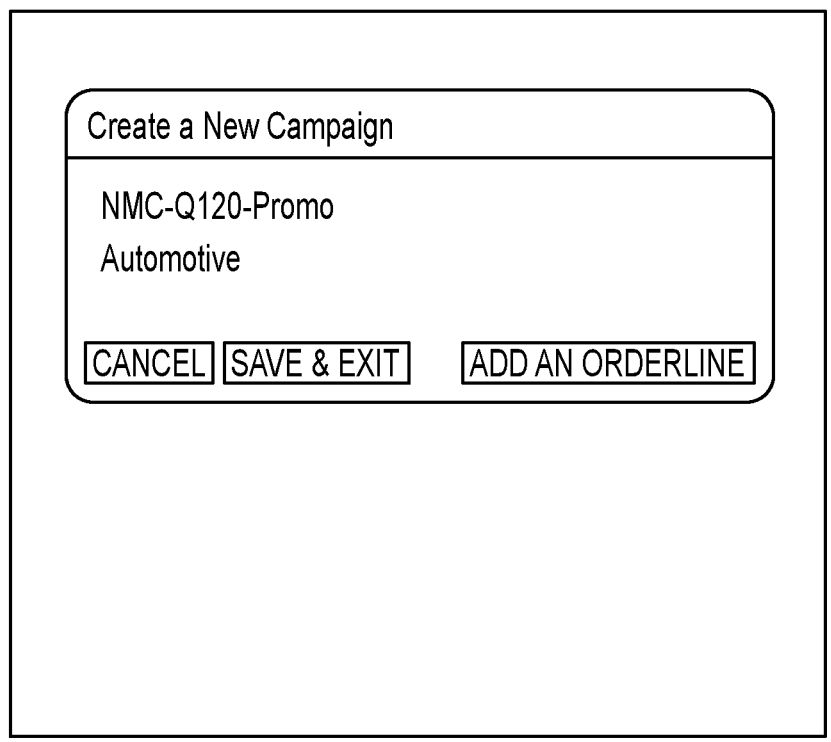

Individual steps in the workflow 700 will now be described in more detail in relation to example user interface screens of FIGS. 8-25. The campaign creation process is initiated by entering basic campaign information. FIG. 8A shows a basic user interface screen in this regard where an advertiser or agent may enter a campaign name and type. The type of campaign may identify a product or service category or other high-level information about the campaign. The type may be selected from a pulldown menu or simply entered by the user. FIG. 8B shows a slightly more detailed user interface screen in this regard. In this case, the user may be prompted to enter a campaign name as well as certain information regarding the target audience and the timeframe of the campaign. In particular, a user may enter target information regarding a budget for the campaign, a desired number of impressions, a number of households to be targeted, and a segment name. The segment name may identify a particular audience segment in terms of predefined categories concerning demographics, interests, purchasing behavior, or the like. It will be appreciated that the system may also support custom audience segments. The information regarding the timeframe of the campaign may include various types of information such as a start date of the campaign, a duration of the campaign, days of the week on which the campaign should be executed, time periods of the relevant days, and frequency information, among other things.

Additional user interfaces may be employed to prompt the user to enter information defining the campaign. The user interface of FIG. 9 prompts a user to enter information regarding, for example, the type of campaign, impressions, frequency, and cost per thousand impressions or CPM. For example, with regard to the type of campaign, user may employ a pulldown menu to select options such as avails, aggregation, MASO, SASO, or location-based targeting, e.g., zone targeted advertising (ZTA). As indicated in the left panel of FIG. 9, the campaign creation process may include a series of steps identified as Line Info, Target Audience, Flighting, Distribution, and Assets.

FIG. 10 illustrates a screen that may be utilized to define the target audience for a campaign. As shown, a user may define one or more audience segments defining the target audience for a campaign. In the illustrated screen, examples of segments include male, 18-34 years, an income bracket, and other information such as, for example, auto intenders. These audience classifications may be selected from a menu of standardized segmentation options or may be custom classifications. It will be appreciated that definition of standardized audience segmentations will facilitate operation across multiple distribution partners and other parties. The illustrated interface also allows a user to select platforms or distribution partners for the campaign.

FIG. 26 illustrates one of many considerations that may be relevant to selecting and balancing addressable asset delivery approaches. In particular, FIG. 26 illustrates considerations related to balancing addressable asset delivery via a DVR approach and via an insertion channel approach such as channel hopping where asset options are delivered via dedicated asset channels. As shown, the DVR approach may enable more asset choices for a given device depending on the disk space available for asset storage. On the other hand, the insertion channel approach is limited by the number of insertion channels. This may be taken into consideration in relation to campaign parameters.

The illustrated workflow may then proceed to a flighting screen such as shown in FIG. 11. As shown, a graphical calendar interface allows a user to conveniently indicate a start date, an end date, and any days when the campaign will be active or inactive within that date range. Such flighting may be done on a line-by-line basis where a given campaign may include multiple campaign lines. Such lines may temporally overlap. It will be appreciated that the campaign entry screens may support multiple sales models, impression targets, frequency caps, CPM information, audience targeting and flighting rules.

The workflow may then proceed to flighting screens such as shown in FIG. 12. As shown, the user may enter start and end dates for a campaign line as discussed above. In this case, however, a flighting schedule, including schedules for multiple lines, may be depicted as shown in the right panel of FIG. 12. Further, as shown, the various user interface screens may include supporting material such as supporting articles relevant to the particular step of the workflow and other support information.

Figure 14:
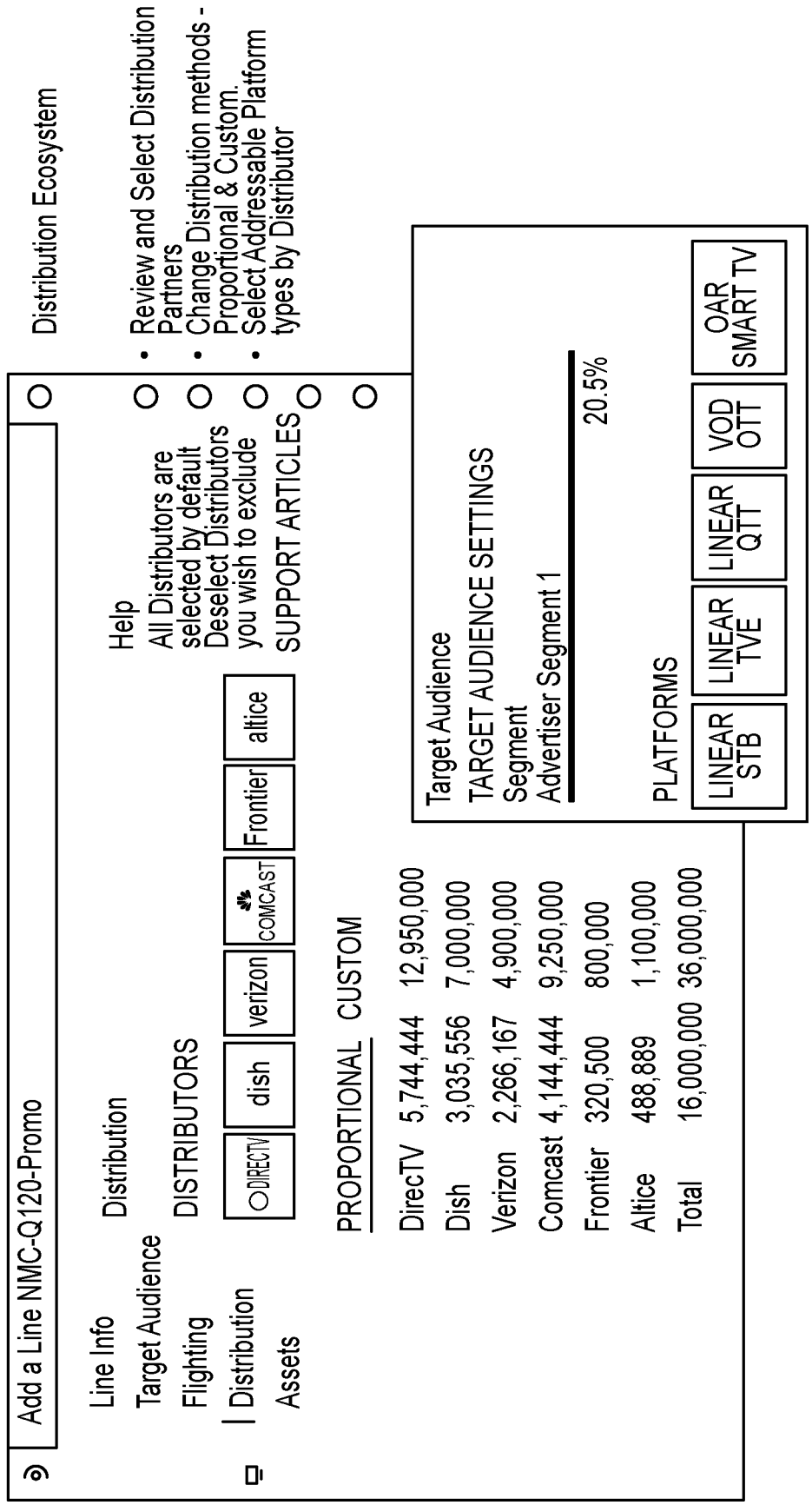

FIG. 13 illustrates a user interface screen that may be provided in connection with the distribution portion of the workflow. At this stage, the user may select or deselect distribution partners such as MVPDs for distribution of the campaign. In addition, the user may select whether the distribution should be, for example, proportional or custom. Proportional distribution may involve predefined allocation of impressions as between the various distribution partners whereas a custom distribution may allow the user to enter custom defined distribution parameters. As shown in FIG. 14, the user may further define distribution platforms by distributor. For example, the user may select as between various linear, OTT, and Smart TV platforms.

The campaign creation process may then advance to the asset identification stage as illustrated in FIG. 15. At this stage, the user can identify the specific asset or assets for the campaign. As noted above, the assets may be stored in an asset repository. Accordingly, the user may enter the exact URL for the campaign line asset and select a transcoding option from available options. User may also enter description information and metadata information associated with the asset.

The campaign creation process may also involve campaign modeling. FIG. 16 illustrates an exemplary screen that may be displayed in connection with the campaign modeling process. As shown, the screen may include a variety of information summarizing the campaign parameters and may further include a projection of forecasted impressions, estimated reach, and estimated costs. The forecasted impressions may include information showing the distribution of impressions over time as well as a breakdown of impressions over time with respect to individual distribution partners. Based on these projections, a user may elect to revise certain campaign parameters. For example, if costs exceed a budget, a user may reduce total impressions, change the selected distribution partners, modify the targeted audience, or make other modifications. If the projections failed to meet campaign goals, a user may add distribution partners, expand a targeted audience, or make other changes. It will thus be appreciated that the campaign creation process may be an iterative process.

The workflow may then proceed to distribution partner acceptance. As noted above, the user may identify a number of desired distribution partners for a campaign. Once the campaign creation process is completed, the distribution platform may transmit proposed orderlines to the identified distribution partners. The proposed orderlines may then be added to a campaign management application screen as shown in FIG. 17. As shown, the screen identifies a number of campaigns together with status information. The status information may include information identifying the readiness of the campaign and the creative status of the campaign. The distribution partner may use the screen to and make a decision regarding whether to accept or reject the campaign.

Figure 19:
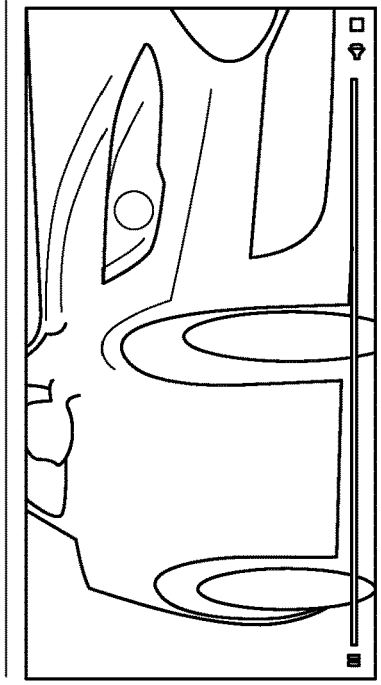
Figure 20:
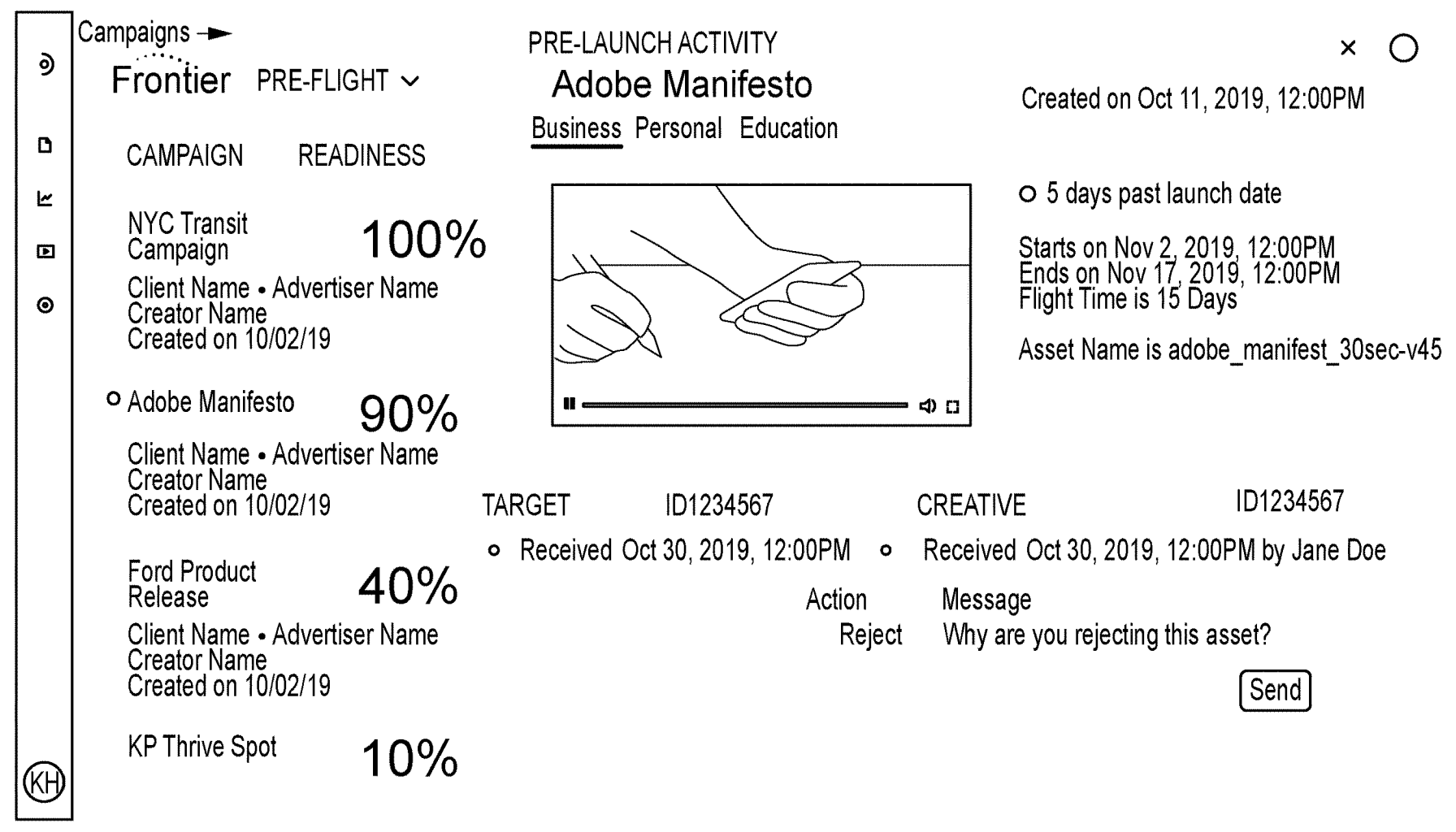

Upon selecting a campaign, the distribution partner may receive line information and asset details as shown in FIG. 18. The screen presents sufficient information regarding the asset and campaign to enable the distribution partner to make an approval or rejection decision. The screen may provide warnings or otherwise identify any nonstandard or problematic details, such as a duration that exceeds standard spot lengths. FIG. 19 shows a review checklist screen that the distribution partner may use in the approval or rejection process. In this case, the review checklist screen is used by the distribution partner to indicate rejection criterion such as "asset length is too long." FIG. 20 shows an example of a screen provided in connection with an asset rejection. The content provider may activate the campaign even when less than all of the content distributors have accepted or even replied.

FIGS. 21-25 show user interface screens that may be provided in connection with a campaign management portion of the workflow. Specifically, FIG. 21 shows an example of an overall campaign management screen that may be used as a kind of dashboard for monitoring active and pending campaigns. Such a screen may show, on a campaign-by-campaign basis, information regarding lines and assets, a timeline for the campaign, distributors, progress in relation to targets, creative status, and attribution. Pull-down menus allow the administrator to access additional information regarding order status, target status and creative status, for example.

Attribution relates to which content distributors, websites, programming networks and the like are associated with a particular delivery, conversion, or other credit. Such attributions may determine who gets paid for a delivery, conversion, or other event as well as allow for analysis of campaign effectiveness. In the case of billing based on deliveries or guaranteed/verified deliveries, reports may identify the content provider, the distribution network, and/or the portal used to access the content and program/programming network/website associated with the delivery. In the case of compensation or analysis based on conversions, specific website visits or purchases may be correlated to reports for previously delivered assets so as to credit the conversion to a particular campaign, content distributor and associated content. Appropriate rules can be developed to correlate asset deliveries to conversions. For example, the conversion may be credited to the most recent delivery or the most frequent deliveries or may be distributed over all deliveries within a selected time frame. Analysis may assist in determining what deliveries contributed to conversions. For example, if 1000 users received an asset and 100 of those made subsequent purchases of the relevant product or service and if, moreover, of the 100 who made purchases, 50 received the asset via television and 50 received the asset by television and cell phone, it may be determined that televised delivery of the asset was of particular importance. This may affect compensation as well as assist in planning for future campaigns.

From the overall campaign management screen, the user can select a particular campaign and receive an overall campaign summary screen as shown in FIG. 22. Such a screen can present information concerning the status of the campaign. In the illustrated example, the user can view status information broken down by distribution partners including approval status and distribution status among other things. FIG. 23 shows another example of a campaign summary screen that may include summary information for multiple campaigns. In this case, the summary screen includes information showing progress towards a total impressions goal, the type of campaign, and other status information. To facilitate review, campaign status information may be color-coded or otherwise emphasized to indicate progress toward fulfillment (for example, in relation to aggregation campaigns), e.g., green indicating on course to meet campaign goals, yellow to indicate potential issues, and red to indicate campaigns that are unlikely to meet goals. Similar summary screens and color coding may be provided for content distributors to monitor usage of inventory.

Figure 24:
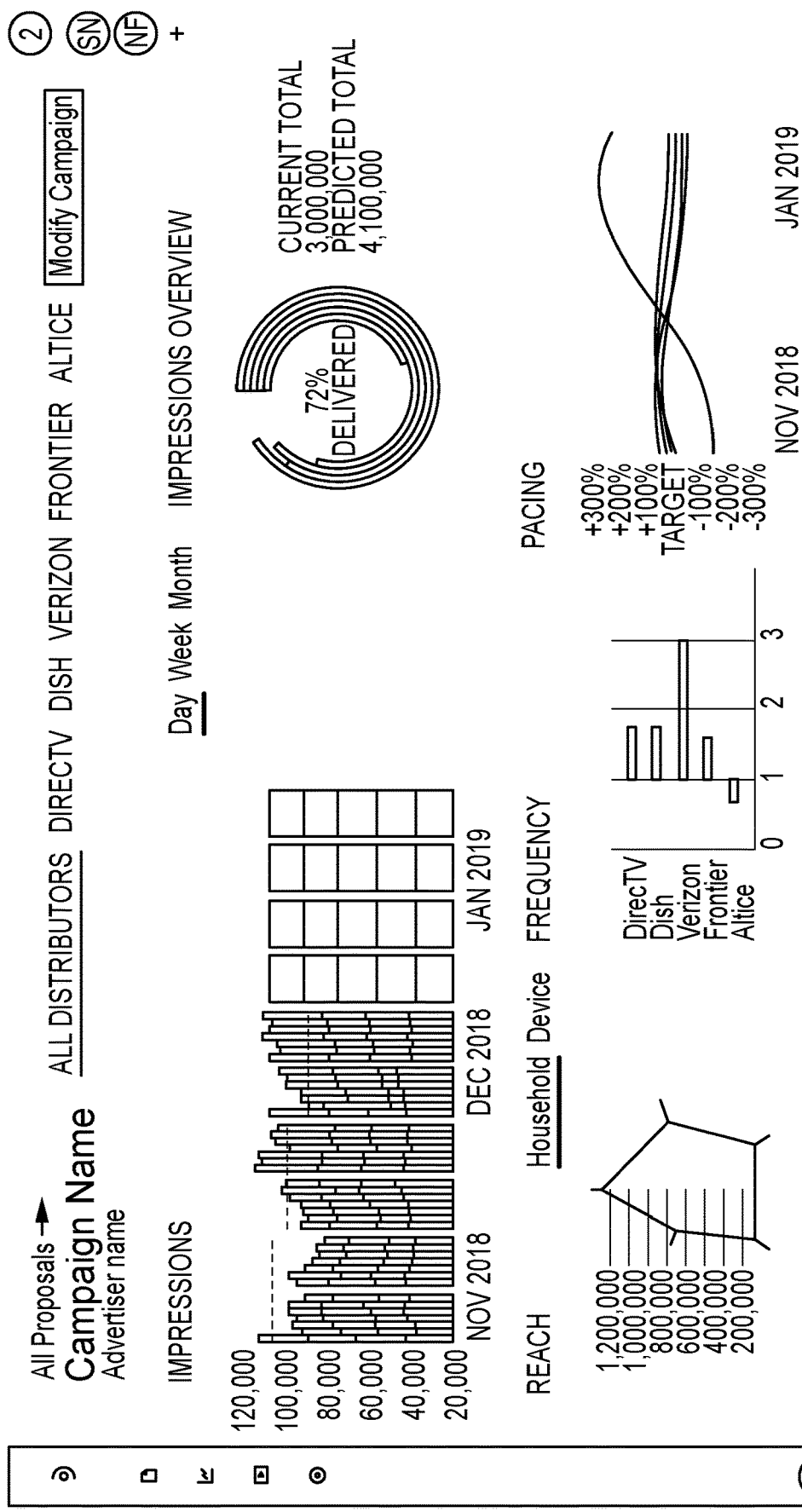

FIG. 24 shows a user interface screen that can be used to monitor campaign metrics in-flight or during the campaign time period. As shown, the metrics may include actual metrics for past time periods as well as projected information (shown in gray or faded). Examples of metrics that may be presented include impressions, reach, and pacing information broken down by individual distribution partners.

Figure 25:
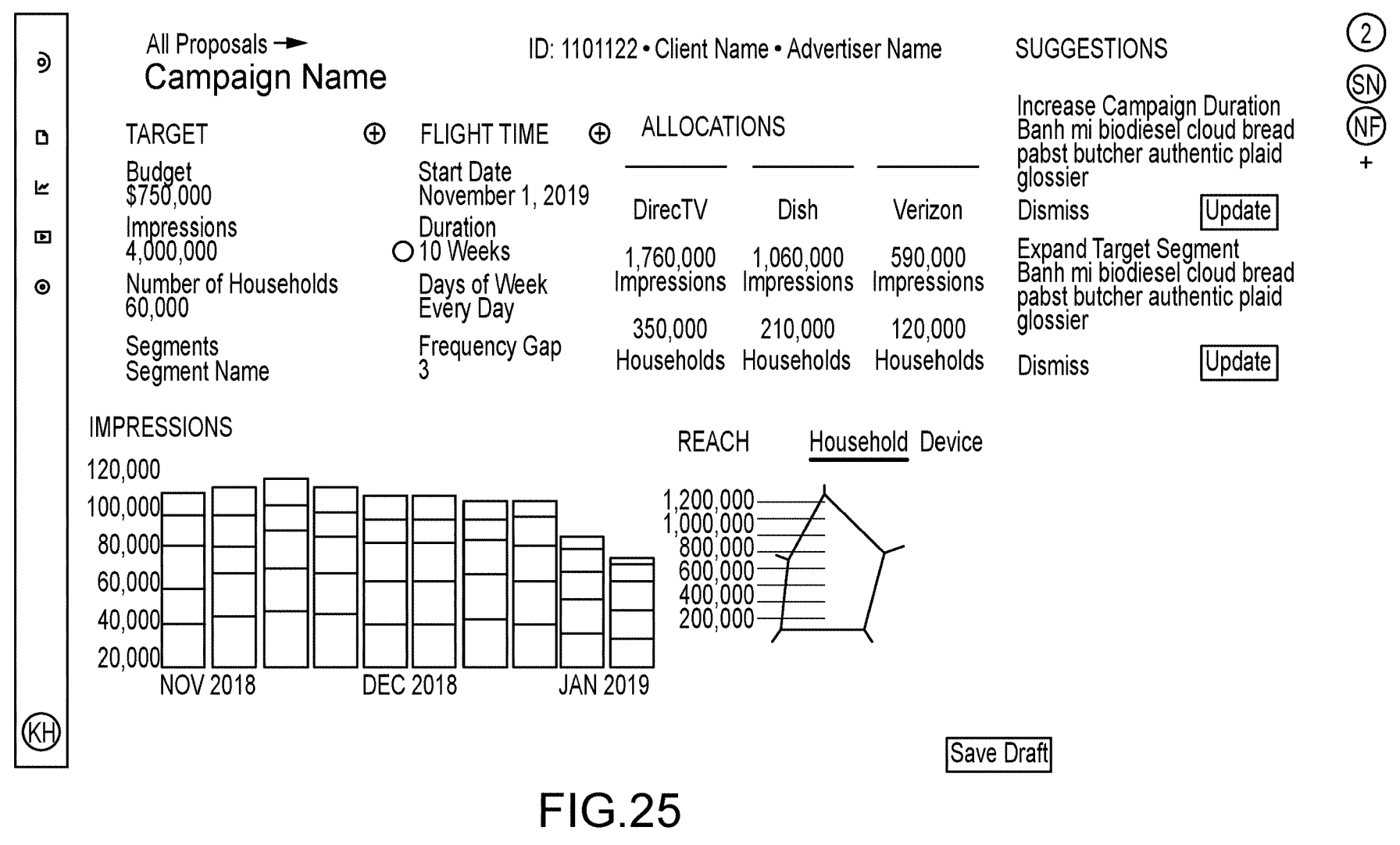

In some cases, for example, upon reviewing in-flight campaign metrics, an advertiser or agent may wish to make in-flight campaign changes. FIG. 25 is an example of a screen that may be used in this regard. As shown, the screen may include summary information regarding the status of the campaign and projections of campaign results in relation to goals. In cases where the campaign is projected to come up short of certain goals, potential measures to make up the difference may be suggested as shown in FIG. 25. For example, if total impressions are projected to come up short of campaign goals, suggested options such as increasing campaign duration or expanding the target segment may be provided, along with links to pages for updating associated campaign parameters. Upon updating such parameters, new projections may be generated to assist in meeting campaign goals. The foregoing description of the present invention has been presented for purposed of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A media distribution platform for assets, comprising:
a front-end processor configured to:
receive first inventory allocation information from a first content distributor indicative of a first available asset delivery opportunity in network content;
receive second inventory allocation information from a second content distributor indicative of a second available asset delivery opportunity in network content;
receive campaign instructions from a content provider, wherein the campaign instructions comprise at least one selected targeting attribute selected from a plurality of selectable targeting attributes and an audience size for a campaign associated with at least one asset; and
analyze the campaign instructions to identify a plurality of selected subscribers; and
a distribution network configured to:
transmit respective first and second insertion orders to the first and second content distributors, wherein the first and second insertion orders identify the asset, one or more attributes of the asset, and distribution information based on the campaign instructions and on the identified plurality of selected subscribers;
receive an acceptance of at least one of said first and second insertion orders from said first content distributor;
receive a rejection of at least one of said first and second insertion orders from said second content distributor, said rejection based at least in part on said attributes of the asset; and
activate said campaign with respect to said first content distributor.

2. The media distribution platform of claim 1, wherein each of said first and second content distributors is a content distribution network.

3. The media distribution platform of claim 1, wherein:
the first content distributor is a first distribution network; and
the second content distributor is a first programmer.

4. The media distribution platform of claim 1, wherein:
the first content distributor is a first programmer; and
the second content distributor is a second programmer.

5. The media distribution platform of claim 3, wherein:
the first distribution network is a multichannel video programming distributor; and
the first programmer is a national cable network or a broadcaster.

6. The media distribution platform of claim 1, wherein:
at least one of the first and second asset delivery opportunities is an entire commercial advertisement spot.

7. The media distribution platform of claim 1, wherein one of the first and second inventory allocation information comprises at least one of a duration of a respective one of the first and second available asset delivery opportunities, a date and time during which the respective one of the first and second available asset delivery opportunities is scheduled, a requested price associated with the respective one of the first and second available asset delivery opportunities, and historical attribute information associated with programming content scheduled around the respective one of the first and second available asset delivery opportunities.

8. The media distribution platform of claim 1, wherein:
at least one of the first and second asset delivery opportunities comprises a first program audience segment;
wherein each said program audience segment comprises a portion of an audience in a network subdivision during a break in programming;
a different asset is configured to be delivered to a second program audience segment in the network subdivision during the same break in the programming; and
a determination to deliver the asset to the first program audience segment and not deliver the asset to the second program audience segment is made independent of a network topology.

9. The media distribution platform of claim 1, wherein:
the media distribution platform provides, to at least one of said first and second content distributors, a target list of subscribers for delivery of the asset, where the target list comprises a list of subscriber keys associated with the selected subscribers, each of said subscriber keys comprising an anonymous identifier for use in said media distribution platform.

10. The media distribution platform of claim 1, wherein:
the media distribution platform is further operable to select a plurality of device IDs; each of the plurality of device IDs is associated with an electronic device associated with one of a plurality of subscriber keys received from the first content distributor, each of said subscriber keys comprising an anonymous identifier for use in said media distribution platform; and a campaign target list comprises the plurality of device IDs usable for addressing delivery of the asset to each respective electronic device.

11. The media distribution platform of claim 1, wherein the media distribution platform is operable to identify recipients for the asset based on consumer information that comprises at least one of credit score, loyalty program membership, income, past purchase data, gender, occupation, social media activity, requests for information and age.

12. The media distribution platform of claim 1, wherein the media distribution platform is operable to receive reporting information from the first content distributor, said reporting information comprising at least one of affirmation that the asset was transmitted to at least one device associated with each selected subscriber of the plurality of selected subscribers, affirmation that the asset was played on said at least one device, and information indicating that each selected subscriber of the plurality of selected subscribers was actively engaged with said at least one device during playing of the asset.

13. The media distribution platform of claim 1, further comprising:
a settlements processor configured to calculate an account balance based upon a received reporting information.

14. The media distribution platform of claim 1, further comprising:
an audit processor configured to provide a third-party auditor access to auditing data associated with the media distribution platform, wherein said auditing data is anonymized to prevent unauthorized access to personally identifiable information.

15. The media distribution platform of claim 1, further comprising: a programmatic buying extension processor configured to analyze consumer information from a data management platform and reporting information to estimate influence information associated with a media asset.

16. The media distribution platform of claim 1, further comprising:
a campaign optimization tools processor configured to analyze the campaign instructions and
associated reporting information to formulate suggested campaign instructions.

17. The media distribution platform of claim 1, further comprising:
a creative distribution processor configured to transmit the asset to the first content distributor.

18. A method for distributing assets, comprising:
operating a front-end processor to:
receive first inventory allocation information from a first content distributor indicative of a first available asset delivery opportunity in network content;
receive second inventory allocation information from a second content distributor indicative of a second available asset delivery opportunity in network content;
receive campaign instructions from a content provider, wherein the campaign instructions comprise at least one selected targeting attribute selected from a plurality of selectable targeting attributes and an audience size for a campaign associated with at least one asset; and
analyze the campaign instructions to identify a plurality of selected subscribers; and
operating a distribution network to:
transmit respective first and second insertion orders to the first and second content distributors, wherein the first and second insertion orders identify the asset, one or more attributes of the asset, and distribution information based on the campaign instructions;
receive an acceptance of at least one of said first and second insertion orders from said first content distributor;
receive a rejection of at least one of said first and second insertion orders from said second content distributor, said rejection based at least in part on said attributes of the asset; and
activate said campaign with respect to said first content distributor.

19. The method of claim 18, wherein each of said first and second content distributors is a content distribution network.

20. The method of claim 18, wherein:
the first content distributor is a first distribution network; and
the second content distributor is a first programmer.

21. The method of claim 20, wherein:
the first content distributor is a first programmer; and
the second content distributor is a second programmer.

22. The method of claim 20, wherein:
the first distribution network is a multichannel video programming distributor; and
the first programmer is a national cable network or a broadcaster.

23. The method of claim 18, wherein:
at least one of the first and second asset delivery opportunities is an entire commercial advertisement spot.

24. The method of claim 18, wherein one of the first and second inventory allocation information comprises at least one of a duration of a respective one of the first and second available asset delivery opportunities, a date and time during which the respective one of the first and second available asset delivery opportunities is scheduled, a requested price associated with the respective one of the first and second available asset delivery opportunities, and historical attribute information associated with programming content scheduled around the respective one of the first and second available asset delivery opportunities.

25. The method of claim 18, wherein:
at least one of the first and second asset delivery opportunities comprises a first program audience segment;
wherein each said program audience segment comprises a portion of an audience in a network subdivision during a break in programming;
a different asset is configured to be delivered to a second program audience segment in the network subdivision during the same break in the programming; and
a determination to deliver the asset to the first program audience segment and not deliver the asset to the second program audience segment is made independent of a network topology.

26. The method of claim 18, wherein:
the distribution platform provides, to at least one of said first and second content distributors, a target list of subscribers for delivery of the asset, where the target list comprises a list of subscriber keys associated with the selected subscribers, each of said subscriber keys comprising an anonymous identifier for use in said media distribution platform.

27. The method of claim 18, wherein:
the distribution platform is further operable to select a plurality of device IDs;
each of the plurality of device IDs is associated with an electronic device associated with one of a plurality of subscriber keys received from the first content distributor, each of said subscriber keys comprising an anonymous identifier for use in said media distribution platform; and
a campaign target list comprises the plurality of device IDs usable for addressing delivery of the asset to each respective electronic device.

28. The method of claim 18, wherein the distribution platform is operable to identify recipients for the asset based on consumer information that comprises at least one of credit score, loyalty program membership, income, past purchase data, gender, occupation, social media activity, requests for information and age.

29. The method of claim 18, wherein the media distribution platform is operable to receive reporting information from the first content distributor, said reporting information comprising at least one of affirmation that the asset was transmitted to at least one device associated with a corresponding selected subscriber of a plurality of selected subscribers, affirmation that the asset was played on said at least one device, and information indicating that the corresponding selected subscriber was actively engaged with said at least one device during playing of the asset.

30. The method of claim 18, further comprising:
operating a settlements module to calculate an account balance based upon a received reporting information.

31. The method of claim 18, further comprising:
operating an audit module to provide a third-party auditor access to auditing data associated with the media distribution platform, wherein said auditing data is anonymized to prevent unauthorized access to personally identifiable information.

32. The method of claim 18, further comprising:
operating a programmatic buying extension to analyze consumer information from a data management platform and reporting information to estimate influence information associated with a media asset.

33. The method of claim 18, further comprising:
operating campaign optimization tools to analyze the campaign instructions and associated reporting information to formulate suggested campaign instructions.

34. The method of claim 18, further comprising:
operating a creative distribution module to transmit the asset to the first content distributor.

* * * * *